(12) United States Patent
Ebuchi et al.

(10) Patent No.: US 9,695,889 B2
(45) Date of Patent: Jul. 4, 2017

(54) INTERMESH ENGAGEMENT DEVICE

(71) Applicant: TOYOTA JIDOSHA KABUSHIKI KAISHA, Toyota-shi (JP)

(72) Inventors: Hiroaki Ebuchi, Hadano (JP); Makoto Funahashi, Gotenba (JP); Yuji Iwase, Mishima (JP); Shotaro Kato, Susono (JP); Hidekazu Nagai, Susono (JP); Hiroto Hashimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 90 days.

(21) Appl. No.: 14/730,727

(22) Filed: Jun. 4, 2015

(65) Prior Publication Data
US 2015/0354643 A1 Dec. 10, 2015

(30) Foreign Application Priority Data
Jun. 9, 2014 (JP) .................................. 2014-118969

(51) Int. Cl.
*F16D 11/10* (2006.01)
*F16D 48/06* (2006.01)
(Continued)

(52) U.S. Cl.
CPC ............ *F16D 48/064* (2013.01); *B60K 6/445* (2013.01); *F16D 11/14* (2013.01); *F16D 27/118* (2013.01); *B60K 2006/381* (2013.01); *F16D 11/10* (2013.01); *F16D 2011/004* (2013.01); *F16D 2011/008* (2013.01); *F16D 2500/1022* (2013.01); *F16D 2500/10412* (2013.01); *F16D 2500/10462* (2013.01);
(Continued)

(58) Field of Classification Search
CPC ............. F16D 2011/004; F16D 27/108; F16D 2061/047
See application file for complete search history.

(56) References Cited

U.S. PATENT DOCUMENTS

2013/0228027 A1 9/2013 Ikeya et al.
2015/0239333 A1* 8/2015 McGrew, Jr. .......... B60K 6/387
180/65.21

FOREIGN PATENT DOCUMENTS

| JP | 2010-7736 A | 1/2010 |
| JP | 2010-25279 A | 2/2010 |
| JP | 2012-112396 A | 6/2012 |

* cited by examiner

*Primary Examiner* — Robert A Siconolfi
*Assistant Examiner* — Ryan Dodd
(74) *Attorney, Agent, or Firm* — Oblon, McClelland, Maier & Neustadt, L.L.P.

(57) ABSTRACT

An intermesh engagement device includes an intermesh engagement mechanism, a moving member, an actuator configured to apply a thrust to a moving member in an engaging direction, a transmission spring configured to transmit the thrust of the actuator from the moving member to a sleeve, a return spring, a stopper, and an electronic control unit configured to control the actuator. The electronic control unit is configured to execute first control for setting the thrust of the actuator to a thrust in a first region, and, when a halfway stopped state has occurred through the first control, execute second control for setting a thrust larger than the thrust in the first control. The first region is a range in which the thrust is larger than an urging force of the return spring and is smaller than the sum of the urging force of the return spring and a maximum urging force of the transmission spring.

4 Claims, 13 Drawing Sheets

(51) Int. Cl.
    *B60K 6/445*       (2007.10)
    *F16D 11/14*       (2006.01)
    *F16D 27/118*     (2006.01)
    *F16D 11/00*       (2006.01)
    *F16H 61/04*       (2006.01)
    *B60K 6/38*        (2007.10)

(52) U.S. Cl.
    CPC ............... *F16D 2500/3026* (2013.01); *F16D 2500/50239* (2013.01); *F16D 2500/7044* (2013.01); *F16D 2500/70418* (2013.01); *F16D 2500/70631* (2013.01); *F16H 2061/047* (2013.01)

AXIAL DIRECTION

AXIAL DIRECTION

F I G . 14
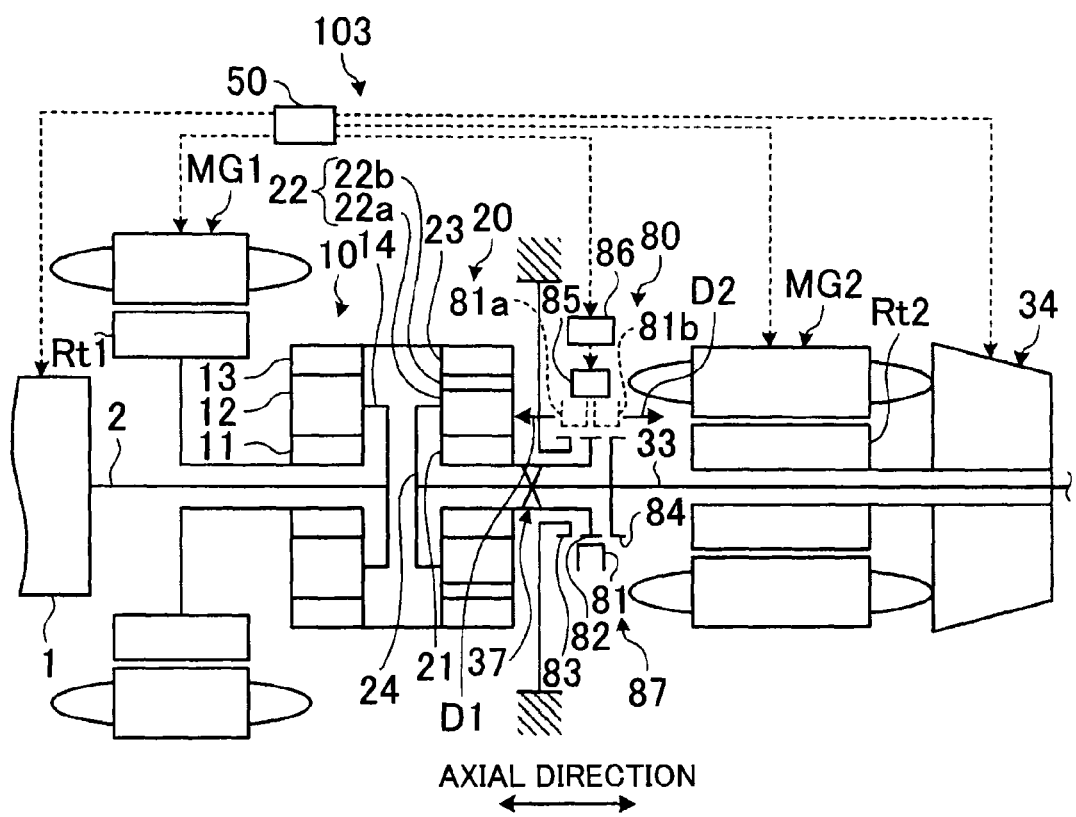

INTERMESH ENGAGEMENT DEVICE

INCORPORATION BY REFERENCE

The disclosure of Japanese Patent Application No. 2014-118969 filed on Jun. 9, 2014 including the specification, drawings and abstract is incorporated herein by reference in its entirety.

BACKGROUND OF THE INVENTION

1. Field of the Invention

The invention relates to an intermesh engagement device.

2. Description of Related Art

There is an existing intermesh engagement device. For example, Japanese Patent Application Publication No. 2010-25279 (JP 2010-25279 A) describes a controller for an electromagnetic clutch. The controller includes first setting means and second setting means. At the time when a pair of clutch elements are changed from a non-engaged state to an engaged state, the first setting means sets a first drive current as an initial drive current for an electromagnetic actuator such that a plunger is accelerated in a direction as a result of application of an urging force to the plunger and then the plunger is decelerated in the direction as a result of the fact that an elastic force exceeds the urging force in response to a stroke amount. The second setting means sets a second drive current that is a new drive current for the electromagnetic actuator such that, after the plunger has been decelerated, impact that occurs at the time of contact of the plunger with a stopper is reduced.

There is still room for improvement in reducing impact due to a collision between a moving member, such as a plunger, and a stopper. For example, the configuration that a transmission spring that transmits the thrust of an actuator is interposed between the moving member and a sleeve is under review. With this configuration, the sleeve and the moving member are relatively movable. Therefore, there is a situation that the stroke amount of the sleeve and the stoke amount of the moving member do not coincide with each other. For example, if the movement of the sleeve is restricted because of contact of a piece with the sleeve, only the moving member can make a stroke while the stoke of the sleeve remains stopped. With such a configuration, if the thrust is controlled on the basis of the stroke amount of the sleeve, there is a possibility that collision noise is not sufficiently reduced because the speed of the moving member is not accurately controlled.

SUMMARY OF THE INVENTION

The invention provides an intermesh engagement device that is able to reduce collision noise due to a collision between a moving member and a stopper.

An aspect of the invention provides an intermesh engagement device. The intermesh engagement device includes an engagement mechanism, a moving member, an actuator, a transmission spring, a return spring, a stopper, and an electronic control unit. The engagement mechanism is an intermesh mechanism including a piece and a sleeve. The engagement mechanism is configured to be engaged or released as the piece and the sleeve relatively move in an axial direction. The moving member is configured to move in the axial direction. The actuator is configured to apply a thrust to the moving member in a direction in which the sleeve is engaged with the piece. The transmission spring is interposed between the moving member and the sleeve. The transmission spring is configured to transmit the thrust of the actuator from the moving member to the sleeve. The return spring is configured to apply an urging force to the moving member in a direction opposite to the direction of the thrust of the actuator. The stopper is provided at a maximum stroke position of the moving member. The stopper is configured to stop the moving member. The electronic control unit is configured to control the actuator. The electronic control unit is configured to (i) at the time when the engagement mechanism is engaged, execute first control for setting the thrust of the actuator to a thrust in a first region, and (ii) when a halfway stopped state of the engagement mechanism has occurred through the first control, execute second control for setting the thrust of the actuator to a thrust larger than the thrust in the first control. The first region is a range in which the thrust of the actuator at a stroke position of the moving member is larger than the urging force of the return spring. The first region is a region in which the thrust of the actuator is smaller than the sum of the urging force of the return spring at the stroke position and a maximum urging force that is generated by the transmission spring at the stroke position in the case where movement of the sleeve is restricted.

In the intermesh engagement device, the electronic control unit may be configured to set a thrust larger than the thrust in the first region for the thrust of the actuator in the second control.

In the intermesh engagement device, the actuator may be configured to attract the moving member by using electromagnetic force. The electronic control unit may be configured to (i) set a first command current value for a command current value in the first control, the command current value being supplied to the actuator in the first control, (ii) set a second command current value larger than the first command current value for a command current value in the second control, the command current value being supplied to the electromagnetic actuator in the second control, and (iii) execute feed-forward control using the first command current value and the second command current value.

In the intermesh engagement device, the electronic control unit may be configured to set a third command current value for a command current value in holding current control for keeping the engagement mechanism in a completely engaged state, the command current value being supplied to the actuator in the holding current control, and the third command current value is a current value smaller than the first command current value.

In the intermesh engagement device, the electronic control unit may be configured to (i) control a rotating machine connected to the piece, and (ii) execute torque variation control for varying an output torque of the rotating machine in the second control.

With the thus configured intermesh engagement device, the electronic control unit provided in the intermesh engagement device executes the first control for setting the thrust of the actuator to the thrust in the first region at the time when the engagement mechanism is engaged. The electronic control unit executes the second control for setting the thrust of the actuator to a thrust larger than the thrust in the first control in the case where the halfway stopped state of the engagement mechanism has occurred through the first control. The first region is a range in which the thrust of the actuator at a stroke position of the moving member is larger than the urging force of the return spring. The first region is a range in which the thrust of the actuator is smaller than the sum of the urging force of the return spring at the stroke position and a maximum urging force that is generated by the transmission spring at the stroke position in the case where movement of the sleeve is restricted. Thus, it is advantageously possible to reduce collision noise due to a collision of the moving member with the stopper.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a schematic configuration view of a vehicle according to a fourth embodiment of the invention.

DETAILED DESCRIPTION OF EMBODIMENTS

Hereinafter, an intermesh engagement device according to embodiments of the invention will be described in detail with reference to the accompanying drawings. The invention is not limited by the embodiments. Components in the following embodiments also encompass components that can be easily conceived of by persons skilled in the art or substantially identical components.

Figure 1:
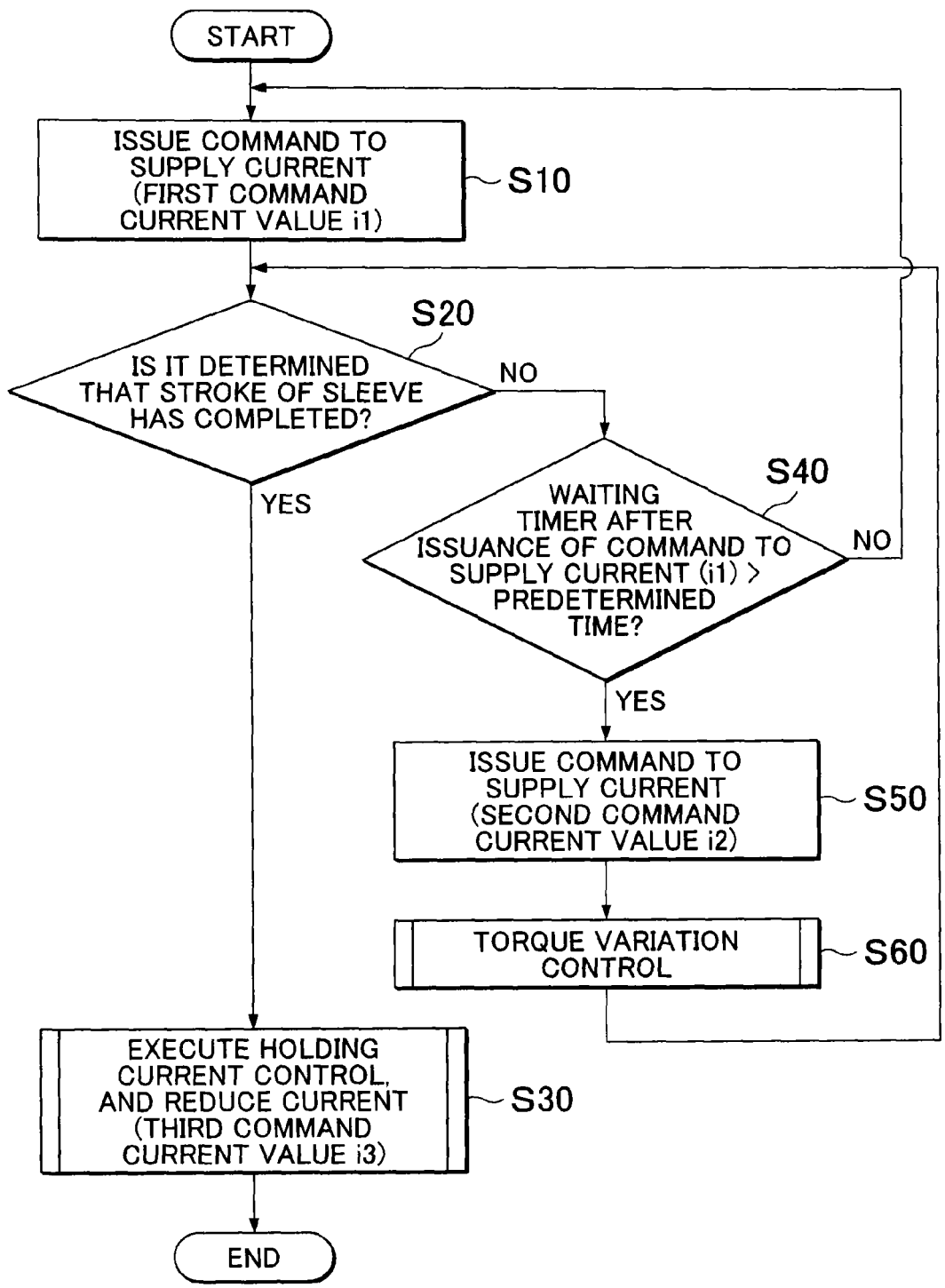
FIG. 1 is a flowchart associated with engagement control according to a first embodiment of the invention.
Figure 2:
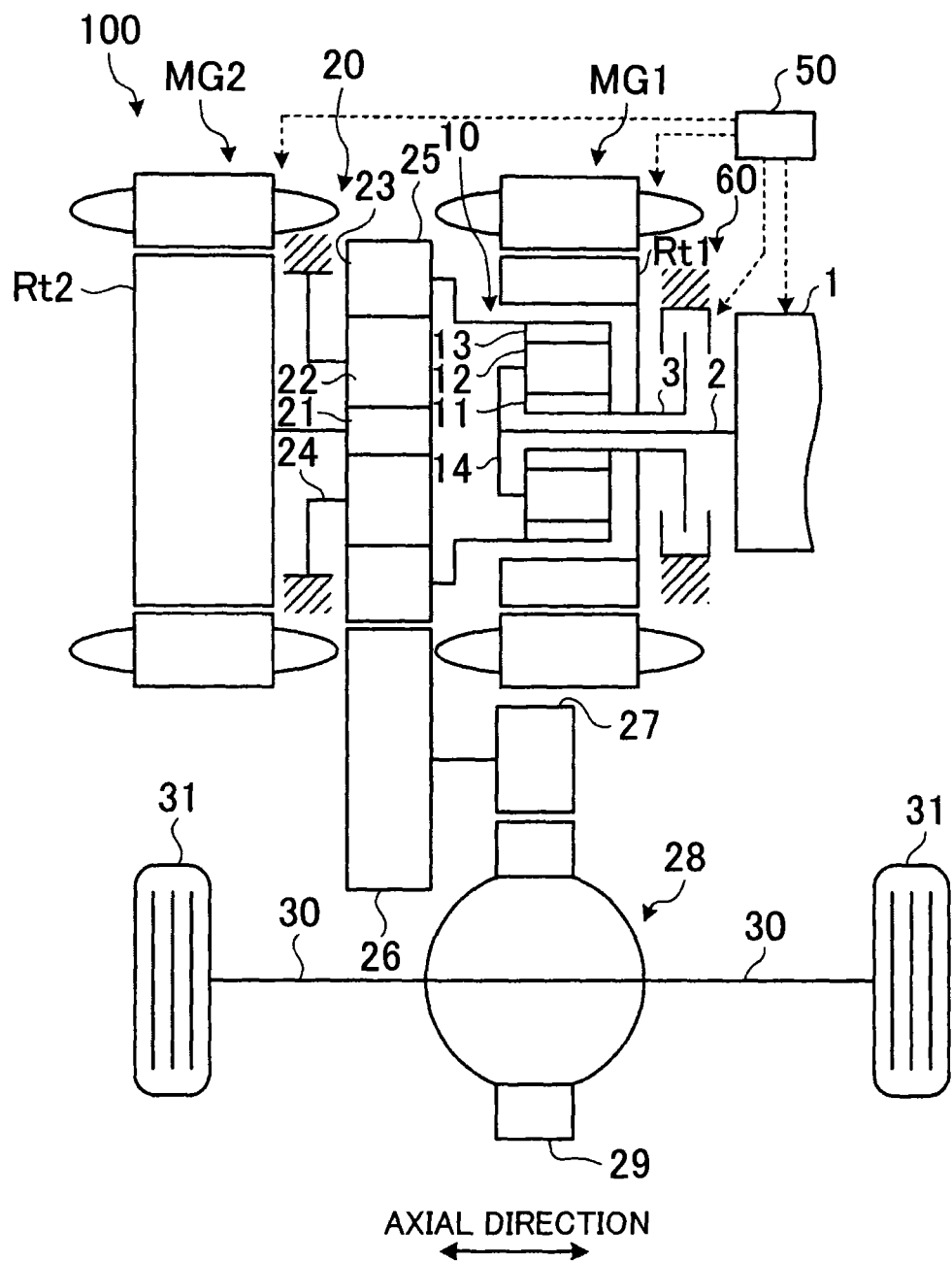
FIG. 2 is a schematic configuration view of a vehicle according to the first embodiment.
Figure 3:
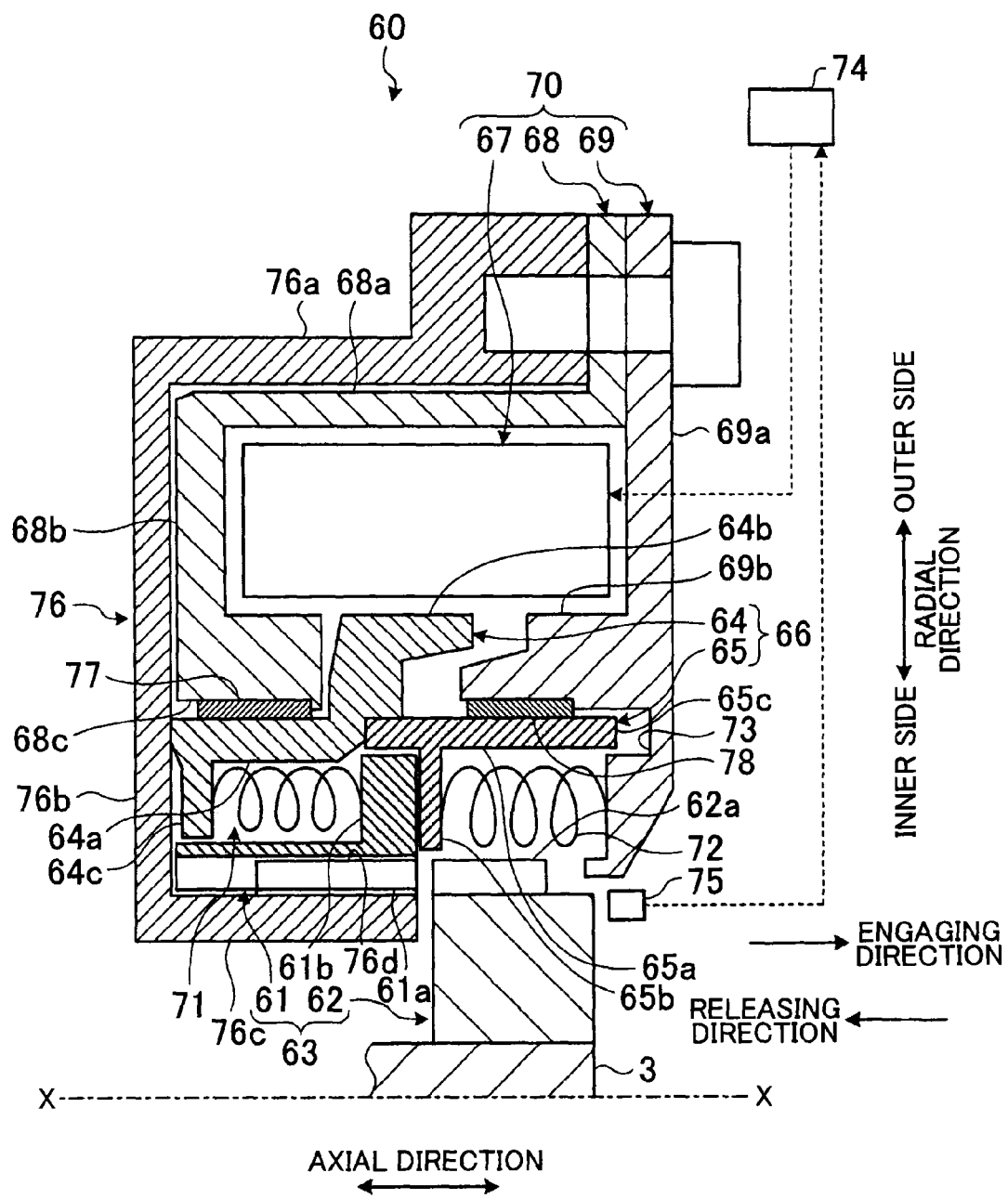
FIG. 3 is a cross-sectional view of an intermesh engagement device according to the first embodiment.
Figure 4:
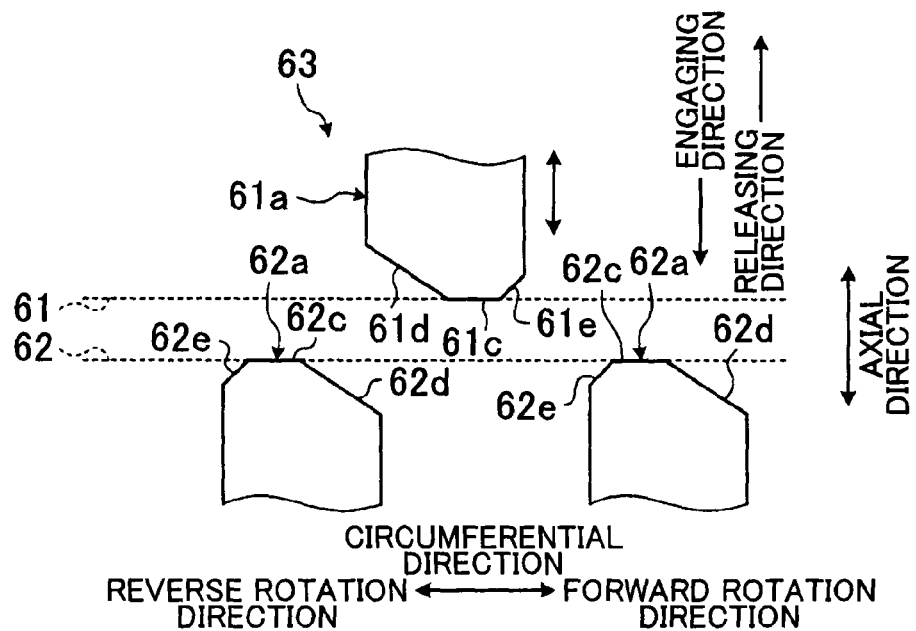
FIG. 4 is a side view of an engagement mechanism according to the first embodiment.
Figure 5:
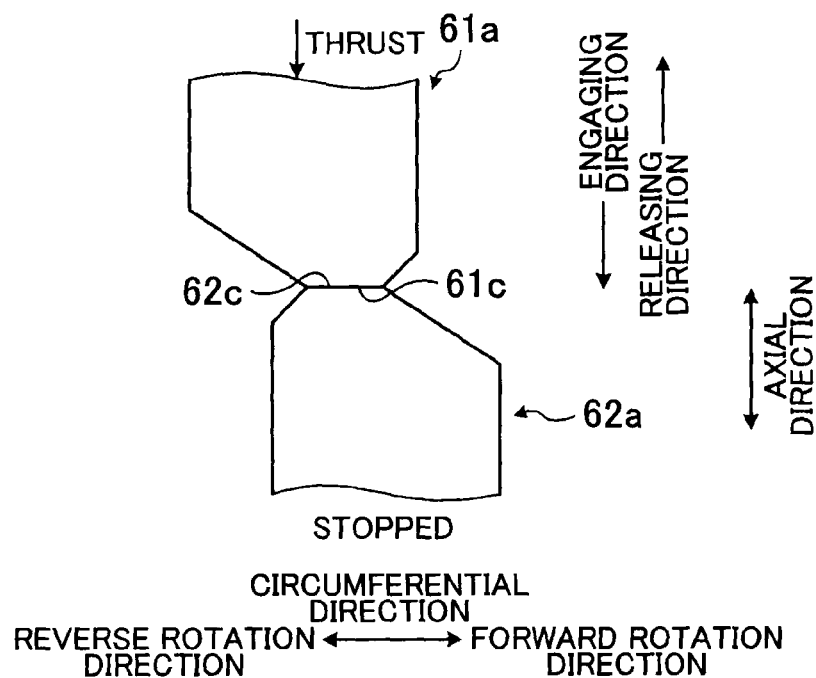
FIG. 5 is a view that shows a state where tooth crests contact each other in the engagement mechanism.
Figure 6:
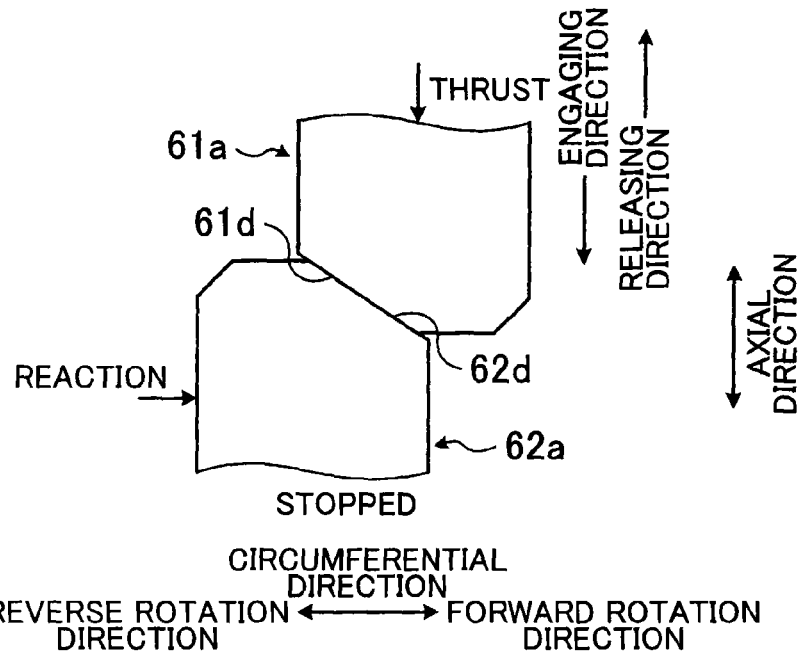
FIG. 6 is a view that shows a state where first inclined faces of tooth tips of dog teeth contact each other in the engagement mechanism.
Figure 7:
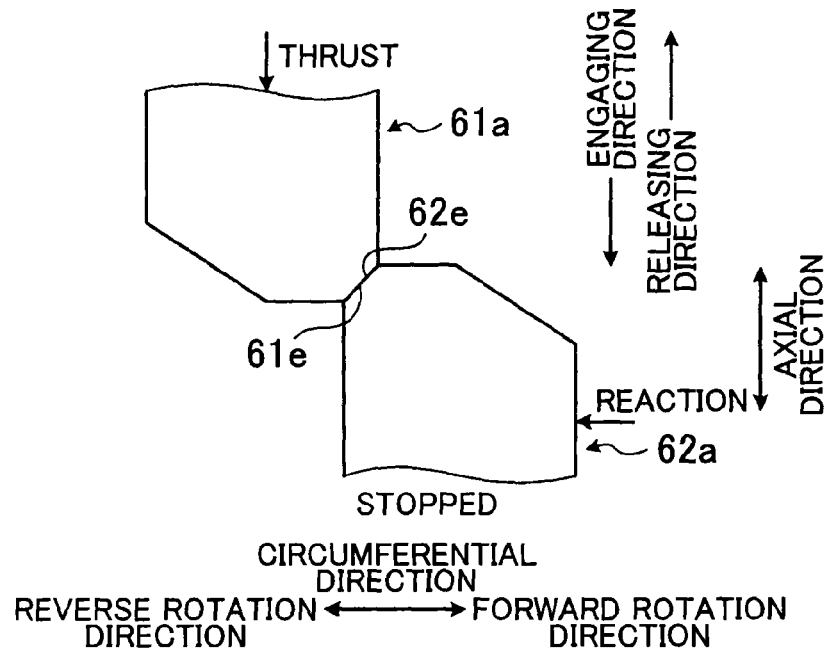
FIG. 7 is a view that shows a state where second inclined faces of tooth tips of dog teeth contact each other in the engagement mechanism.
Figure 8:
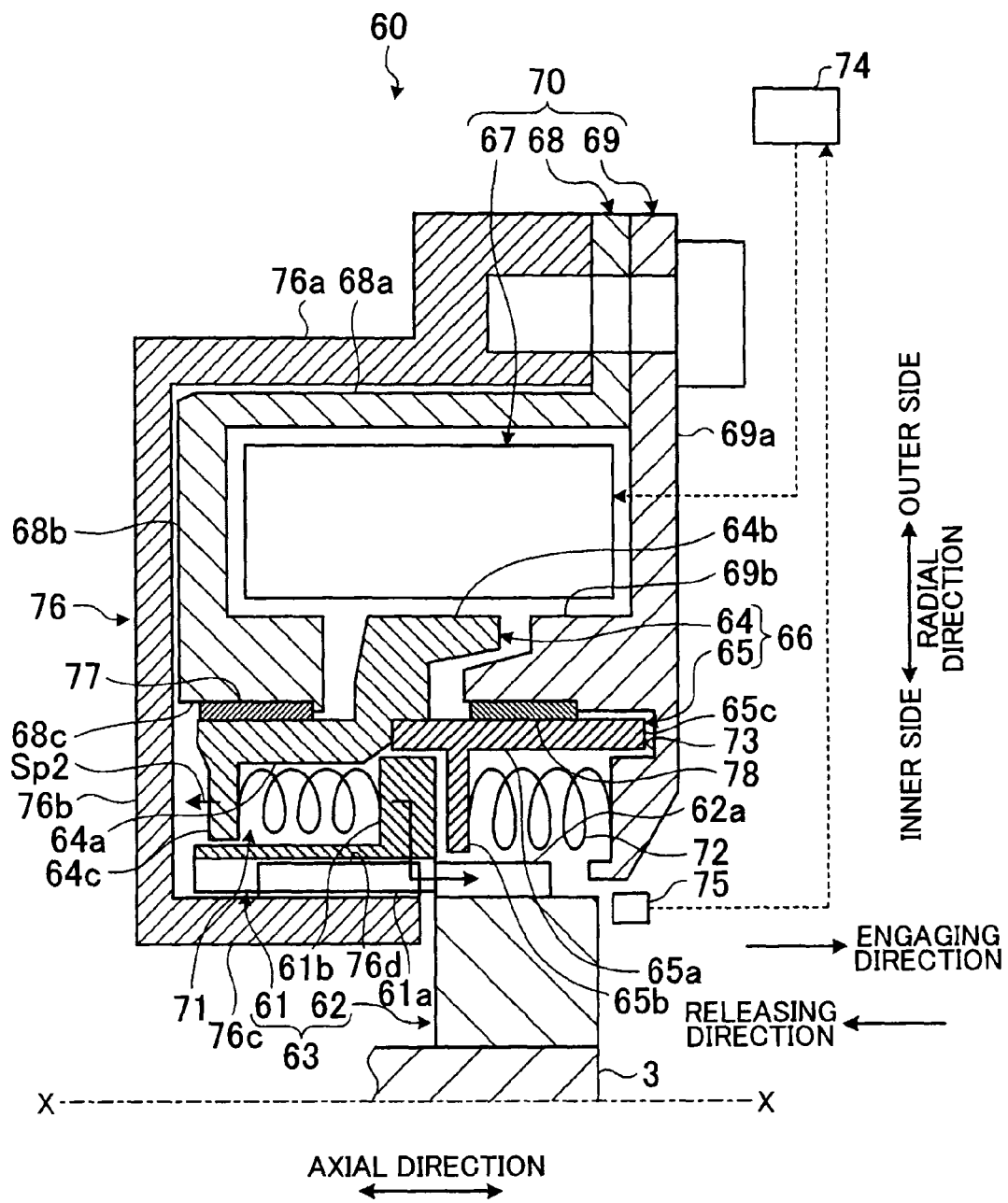
FIG. 8 is a cross-sectional view that shows a halfway stopped state of the engagement mechanism according to the first embodiment.
Figure 9:
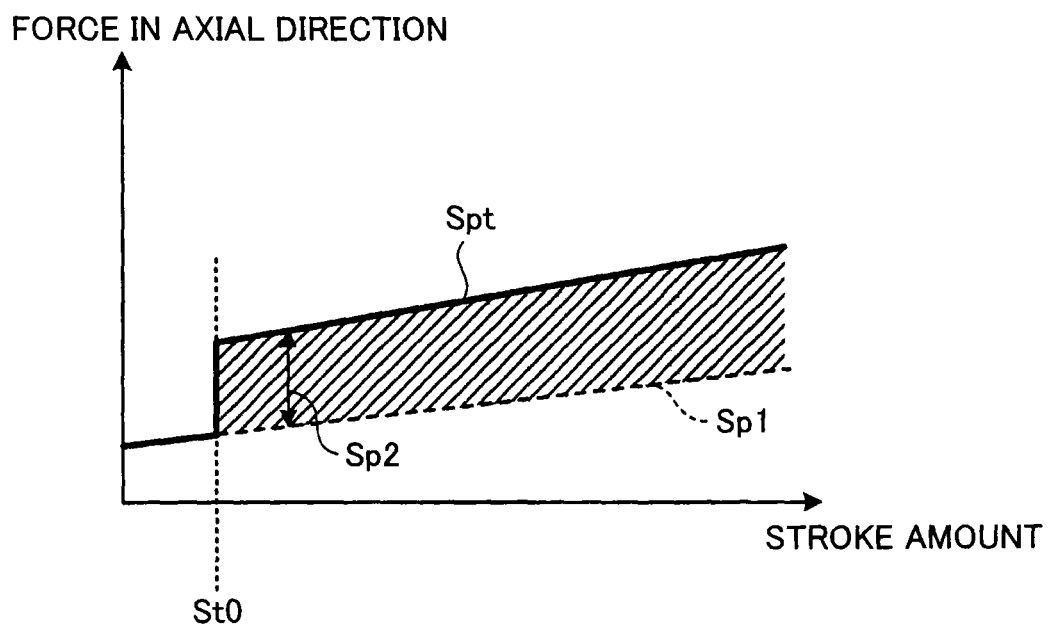
FIG. 9 is a graph that shows an urging force of a transmission spring and an urging force of a return spring in the engagement mechanism.
Figure 10:
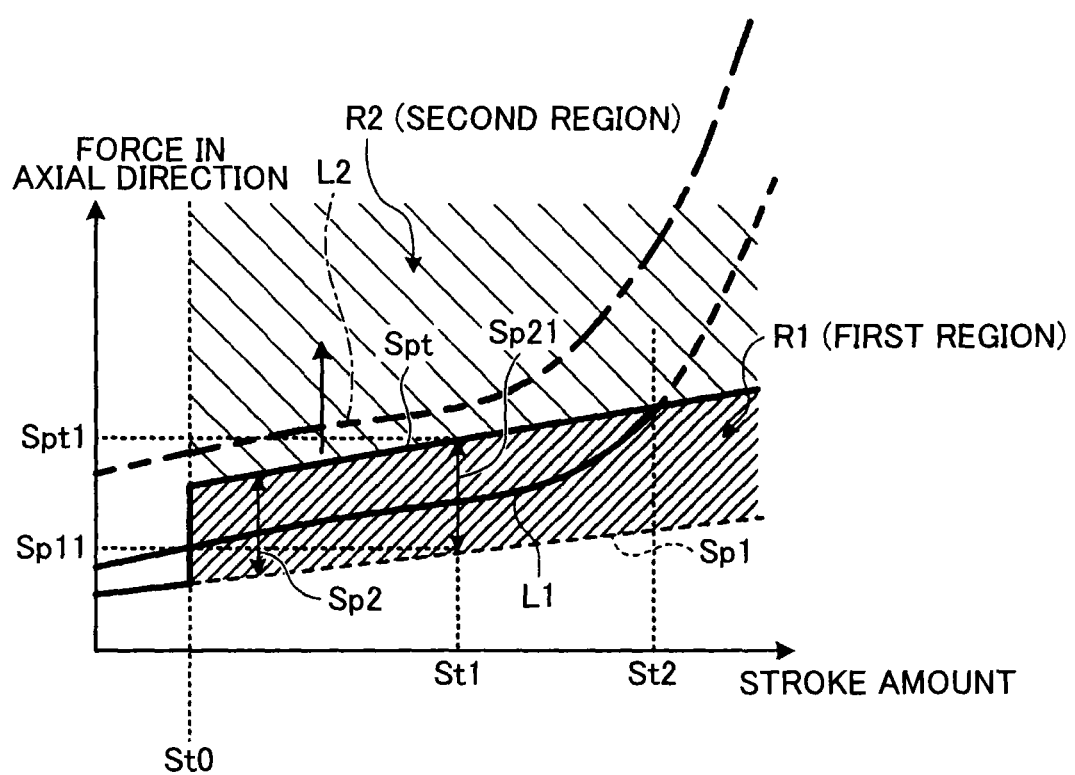
FIG. 10 is a graph that shows the thrust of an actuator of the intermesh engagement device according to the first embodiment.
Figure 11:
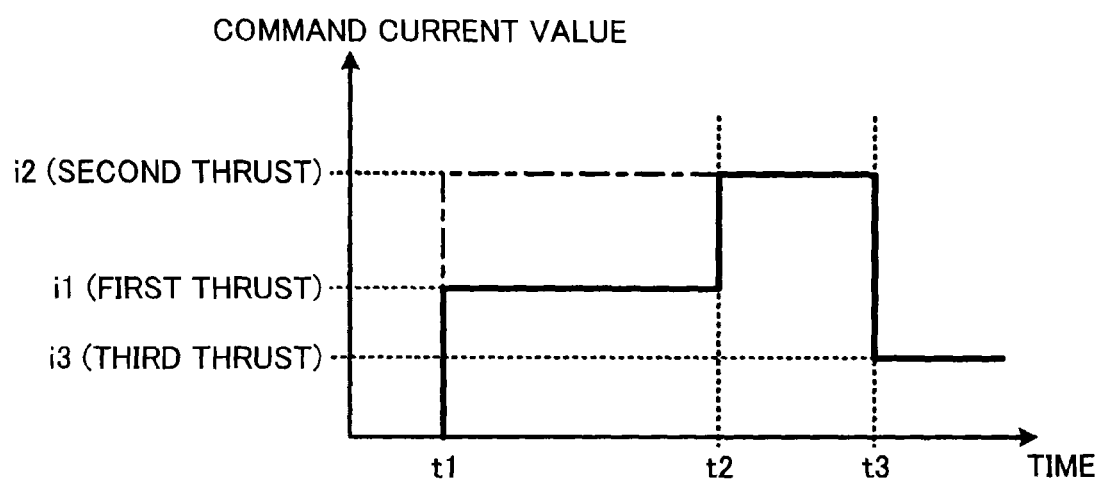
FIG. 11 is a time chart associated with engagement control according to the first embodiment.

The first embodiment will be described with reference to FIG. 1 to FIG. 11. The present embodiment relates to an intermesh engagement device. FIG. 1 is a flowchart associated with engagement control according to the first embodiment of the invention. FIG. 2 is a schematic configuration view of a vehicle according to the first embodiment. FIG. 3 is a cross-sectional view that shows the intermesh engagement device according to the first embodiment. FIG. 4 is a side view that shows an engagement mechanism according to the first embodiment. FIG. 5 is a view that shows a state where tooth crests contact each other. FIG. 6 is a view that shows a state where first inclined faces contact each other. FIG. 7 is a view that shows a state where second inclined faces contact each other. FIG. 8 is a cross-sectional view that shows a halfway stopped state. FIG. 9 is a graph that shows urging forces. FIG. 10 is a graph that shows the thrust of an actuator according to the first embodiment. FIG. 11 is a time chart associated with engagement control according to the first embodiment.

As shown in FIG. 2, a vehicle driving system 100 according to the first embodiment includes an engine 1, a first planetary gear train 10, a second planetary gear train 20, a first rotating machine MG1, a second rotating machine MG2, and the intermesh engagement device 60. The vehicle driving system 100 is a driving system for a hybrid vehicle, and includes the first rotating machine MG1 and the second rotating machine MG2 in addition to the engine 1 as a power source.

The engine 1 converts the combustion energy of fuel into rotating motion and then outputs the rotating motion. The rotary shaft of the engine 1 is connected to an input shaft 2. The input shaft 2 is connected to a first carrier 14 of the first planetary gear train 10. The first planetary gear train 10 is of a single pinion type, and includes a first sun gear 11, first pinion gears 12, a first ring gear 13 and the first carrier 14. The first carrier 14 is connected to the input shaft 2, and integrally rotates with the input shaft 2. The first pinion gears 12 are rotatably supported by the first carrier 14.

The first sun gear 11 is connected to a rotary shaft 3 of a rotor Rt1 of the first rotating machine MG1, and integrally rotates with the rotor Rt1. The intermesh engagement device 60 restricts the rotation of the rotary shaft 3 of the rotor Rt1. The intermesh engagement device 60 functions as a brake device that restricts the rotation of the first sun gear 11 and the rotation of the first rotating machine MG1.

The second planetary gear train 20 is arranged coaxially with the engine 1 and the first planetary gear train 10. The second planetary gear train 20 is of a single pinion type, and includes a second sun gear 21, second pinion gears 22, a second ring gear 23 and a second carrier 24. The second sun gear 21 is connected to a rotor Rt2 of the second rotating machine MG2, and integrally rotates with the rotor Rt2 of the second rotating machine MG2. The second carrier 24 is fixed so as not to rotate. The second ring gear 23 is connected to the first ring gear 13, and integrally rotates with the first ring gear 13.

A counter drive gear 25 is arranged on the outer periphery of the second ring gear 23. The counter drive gear 25 is in mesh with a counter driven gear 26. The counter driven gear 26 is connected to a drive pinion gear 27. The drive pinion gear 27 is in mesh with a differential ring gear 29 of a differential unit 28. The differential ring gear 29 is connected to drive wheels 31 via right and left drive shafts 30.

The vehicle driving system 100 has an EV drive mode and an HV drive mode. The EV drive mode is a drive mode in which the vehicle travels by using the second rotating machine MG2 as a power source. In the EV drive mode, the vehicle desirably travels while the intermesh engagement device 60 is released and the engine 1 is stopped.

The HV drive mode is a drive mode in which the vehicle travels by using the engine 1 as a power source. In the HV drive mode, the vehicle is able to travel by using the second rotating machine MG2 as a power source in addition to the engine 1. The vehicle driving system 100 has a first HV drive mode and a second HV drive mode as the HV drive mode. The first HV drive mode is an HV drive mode in which the first rotating machine MG1 is caused to function as a reaction receiver. In the first HV drive mode, the first rotating machine MG1 outputs reaction torque against engine torque, and causes the engine torque to output from the first ring gear 13.

The second HV drive mode is a drive mode in which the intermesh engagement device 60 is caused to function as a reaction receiver. In the second HV drive mode, the intermesh engagement device 60 is engaged, and the rotation of the first sun gear 11 is restricted. The intermesh engagement device 60 functions as a reaction receiver against engine torque, and causes the engine torque to output from the first ring gear 13.

An electronic control unit (ECU) 50 is a control unit that controls the vehicle driving system 100, and is, for example, an electronic control unit having a computer. The ECU 50 is electrically connected to each of the engine 1, the first rotating machine MG1, the second rotating machine MG2 and the intermesh engagement device 60. The ECU 50 executes fuel injection control, electronic throttle control, ignition control, start-up control, and the like, over the engine 1. The ECU 50 executes torque control, rotation speed control, and the like, over the first rotating machine MG1 and the second rotating machine MG2. The ECU 50 outputs an engaging command or a releasing command to the intermesh engagement device 60.

As shown in FIG. 3, the intermesh engagement device 60 according to the present embodiment includes an engagement mechanism 63, a moving member 66, an actuator 70, a transmission spring 71, a return spring 72, a stopper 73, and a control unit 74. The intermesh engagement mechanism 63 includes a piece 62 and a sleeve 61, and is engaged or released as the piece 62 and the sleeve 61 relatively move in the axial direction. The piece 62 is an annular member, and is arranged coaxially with the rotary shaft 3. The piece 62 is connected to the rotary shaft 3 by spline fitting, or the like, and integrally rotates with the rotary shaft 3. A plurality of dog teeth 62a are arranged on the outer periphery of the piece 62. The dog teeth 62a are arranged at equal intervals in the circumferential direction. In the specification, unless otherwise specified, the "axial direction" indicates the direction of a central axis X of each of the piece 62 and the sleeve 61, and the "radial direction" indicates a radial direction perpendicular to the central axis X. The "circumferential direction" indicates a rotation direction around the central axis X. The ridge lines of the dog teeth 62a extend in the axial direction.

The sleeve 61 is supported by a hub 76, and is relatively movable in the axial direction with respect to the hub 76. The hub 76 is fixed to a vehicle body side. The hub 76 includes a first wall 76a, a second wall 76b and a third wall 76c. The first wall 76a and the third wall 76c are respectively cylindrical components, and are arranged coaxially with each other. The first wall 76a is provided to the radially outer side of the third wall 76c. The second wall 76b connects one axial end of the first wall 76a to one axial end of the third wall 76c. In the description of the intermesh engagement device 60, within the axial direction, a direction in which the sleeve 61 moves toward the piece 62 is termed "engaging direction", and a direction opposite to the engaging direction is termed "releasing direction". In FIG. 3, the direction from the left side of the sheet to the right side of the sheet is the engaging direction, and the direction from the right side of the sheet to the left side of the sheet is the releasing direction. The second wall 76b connects the releasing-side ends of the first wall 76a and third wall 76c.

The dog teeth 76d are arranged on the inner periphery of the third wall 76c. The dog teeth 76d are external teeth that protrude radially outward. Dog teeth 61a that are paired with the dog teeth 76d are provided in the sleeve 61. The dog teeth 61a are arranged on the inner periphery of the sleeve 61. The dog teeth 61a of the sleeve 61 are engaged with the dog teeth 76d of the hub 76. The sleeve 61 is guided by the dog teeth 76d and is relatively movable in the axial direction with respect to the hub 76, and is relatively non-rotatable with respect to the hub 76.

The piece 62 is arranged to the engaging side of the third wall 76c of the hub 76. The dog teeth 62a of the piece 62 and the dog teeth 76d of the hub 76 face each other in the axial direction. The dog teeth 61a of the sleeve 61 are allowed to move in the engaging direction while being guided by the dog teeth 76d of the hub 76 and engage with the dog teeth 62a of the piece 62. When the dog teeth 61a mesh with both the dog teeth 76d and the dog teeth 62a at the same time, the hub 76 is coupled to the piece 62 via the sleeve 61, and the rotation of the piece 62 is restricted.

The actuator 70 applies a thrust to the moving member 66 in the direction in which the sleeve 61 is engaged with the piece 62. The actuator 70 includes a coil 67, a first yoke 68, and a second yoke 69. The first yoke 68 and the second yoke 69 are fixed to the hub 76 by bolts, or the like. The first yoke 68 and the second yoke 69 are arranged on the engaging side of the hub 76. The second yoke 69 is arranged on the engaging side of the first yoke 68. The first yoke 68 includes a first wall 68a, a second wall 68b, and a third wall 68c. The first wall 68a is a cylindrical component, and is arranged along the inner periphery of the first wall 76a of the hub 76. The second wall 68b extends radially inward from the releasing-side end of the first wall 68a. The second wall 68b is an annular component. The third wall 68c is a cylindrical component, and projects from the radially inner end of the second wall 68b in the engaging direction.

The second yoke 69 has a body portion 69a and a projecting portion 69b. The body portion 69a is an annular member, and is fixed to the hub 76. The projecting portion 69b projects from the body portion 69a in the releasing direction. The projecting portion 69b faces the third wall 68c of the first yoke 68 in the axial direction.

The coil 67 is surrounded by the first yoke 68 and the second yoke 69. The outer periphery of the coil 67 faces the first wall 68a of the first yoke 68 in the radial direction. The releasing-side end face of the coil 67 faces the second wall 68b of the first yoke 68 in the axial direction. The inner periphery of the coil 67 faces the third wall 68c of the first yoke 68 and the projecting portion 69b of the second yoke 69 in the radial direction. The engaging-side end face of the coil 67 faces the body portion 69a of the second yoke 69 in the axial direction.

The moving member 66 includes an armature 64 and a plunger 65, and is movable in the axial direction. The armature 64 includes a first cylindrical portion 64a, a second cylindrical portion 64b, and a flange portion 64c. The first cylindrical portion 64a and the second cylindrical portion 64b are respectively cylindrical components, and are arranged coaxially with the central axis X. The second cylindrical portion 64b is located on the engaging side with respect to the first cylindrical portion 64a. The second cylindrical portion 64b is larger in diameter than the first cylindrical portion 64a. The first cylindrical portion 64a is slidably supported by the third wall 68c of the first yoke 68 via a bush 77. The second cylindrical portion 64b is located between the third wall 68c of the first yoke 68 and the projecting portion 69b of the second yoke 69 in the axial direction. The flange portion 64c is arranged at the releasing-side end of the first cylindrical portion 64a. The flange portion 64c is an annular component, and projects from the first cylindrical portion 64a toward the radially inner side.

The flange portion 64c of the armature 64 faces the flange portion 61b of the sleeve 61 in the axial direction. The flange portion 61b is provided at the engaging-side end of the sleeve 61. The flange portion 61b is an annular component, and projects radially outward. The transmission spring 71 is arranged between the flange portion 64c of the armature 64 and the flange portion 61b of the sleeve 61. The transmission spring 71 is interposed between the moving member 66 (the armature 64 and the plunger 65) and the sleeve 61, and transmits the thrust of the actuator 70 from the moving member 66 to the sleeve 61. The transmission spring 71 according to the present embodiment is a coil spring, and is arranged between the flange portion 64c and the flange portion 61b in a pressurized state, that is, a compressed state. The releasing-side end of the transmission spring 71 is fixed to the flange portion 64c of the armature 64. The engaging-side end of the transmission spring 71 is fixed to the flange portion 61b of the sleeve 61.

The plunger 65 includes a body portion 65a and a flange portion 65b. The body portion 65a is a cylindrical component, and is connected to the armature 64. The body portion 65a is fixed to the engaging-side end of the first cylindrical portion 64a of the armature 64 by press-fitting, or the like. The body portion 65a is slidably supported by the projecting portion 69b of the second yoke 69 via a bush 78. The flange portion 65b is an annular component, and projects from the body portion 65a toward the radially inner side. The flange portion 65b faces the flange portion 61b of the sleeve 61 in the axial direction.

A stopper 73 is provided in the second yoke 69. The stopper 73 is provided on the releasing-side wall face of the second yoke 69, that is, the wall face that faces the plunger 65 in the axial direction. The second yoke 69 has an annular groove. The stopper 73 is the bottom face of the groove. The stopper 73 restricts the maximum value of the amount of movement (stroke amount) of the plunger 65 in the engaging direction. In other words, the stopper 73 is provided at the maximum stroke position of the moving member 66 (the armature 64 and the plunger 65), and regulates the maximum stroke position of the moving member 66. When the moving member 66 is driven in the engaging direction by the thrust of the actuator 70, and when a distal end face 65c of the plunger 65 contacts the stopper 73, movement of the moving member 66 in the engaging direction is restricted. The distal end face 65c is the engaging-side end face of the body portion 65a of the plunger 65.

The return spring 72 applies an urging force to the moving member 66 in a direction opposite to the direction of the thrust of the actuator 70. The return spring 72 is arranged between the flange portion 65b of the plunger 65 and the second yoke 69. The return spring 72 according to the present embodiment is a coil spring. The return spring 72 is arranged between the flange portion 65b and the second yoke 69 in a pressurized state, that is, a compressed state. The releasing-side end of the return spring 72 is fixed to the plunger 65. The engaging-side end of the return spring 72 is fixed to the second yoke 69. When the actuator 70 is not generating a thrust, the moving member 66 moves to an initial position shown in FIG. 3 by the urging force of the return spring 72 in the releasing direction. The initial position of the moving member 66 is a position at which the armature 64 contacts the second wall 76b of the hub 76. The stroke amount of the moving member 66 is the amount of movement by which the moving member 66 has moved from the initial position in the engaging direction.

A stroke sensor 75 is a sensor that detects the stroke amount of the sleeve 61. When the actuator 70 is not generating a thrust, the sleeve 61 moves to an initial position shown in FIG. 3 by the urging force of the return spring 72 in the releasing direction. The initial position of the sleeve 61 is a position at which the sleeve 61 contacts the second wall 76b of the hub 76. The stroke amount of the sleeve 61, which is detected by the stroke sensor 75, is the amount of movement by which the sleeve 61 has moved from the initial position in the engaging direction. A signal that indicates the stroke amount detected by the stroke sensor 75 is output to the control unit 74.

The control unit 74 controls the actuator 70. The actuator 70 according to the present embodiment is an electromagnetic actuator that attracts the moving member 66 by using electromagnetic force. The control unit 74 controls a current value at which the coil 67 of the actuator 70 is energized. When the coil 67 is energized, a magnetic field is generated around the coil 67. The first yoke 68, the second yoke 69 and the armature 64 are magnetized by the generated magnetic field, so a thrust that attracts the armature 64 toward the engaging side is generated. The direction of the thrust of the actuator 70 is a direction in which the sleeve 61 is engaged with the piece 62. That is, the actuator 70 applies a thrust to the moving member 66 in a direction in which the sleeve 61 is engaged with the piece 62.

The thrust of the actuator 70 changes with the current value at which the coil 67 is energized. The thrust of the actuator 70 increases as the current value increases. The thrust of the actuator 70 changes with the stroke amount of the moving member 66, that is, the size of the gap in the axial direction between the armature 64 and the projecting portion 69b of the second yoke 69. The thrust of the actuator 70 increases as the stroke amount of the moving member 66 increases.

In the intermesh engagement device 60 according to the present embodiment, the moving member 66 and the sleeve 61 are connected to each other via the transmission spring 71, and the moving member 66 and the sleeve 61 are relatively movable in the axial direction. Thus, as will be described below, responsiveness, and the like, at the time when the engagement mechanism 63 is engaged improves.

In the intermesh engagement mechanism 63, the movement of the sleeve 61 can be restricted by the contact of the dog teeth 61a of the sleeve 61 with the dog teeth 62a of the piece 62 in process of engagement.

As shown in FIG. 4, the tooth tips of the dog teeth 61a and the tooth tips of the dog teeth 62a each are chamfered. Each of the dog teeth 61a of the sleeve 61 has a tooth crest 61c, a first inclined face 61d and a second inclined face 61e. The tooth crest 61c is an engaging-side end face, and is a face perpendicular to the axial direction. The first inclined face 61d and the second inclined face 61e each are inclined with respect to the axial direction. In the rotation direction of the piece 62, the same direction as the rotation direction of the engine 1 is termed "forward rotation direction", and a direction opposite to the forward rotation direction is termed "reverse rotation direction". The first inclined face 61d is provided at the reverse rotation-side end of each of the dog teeth 61a, and is inclined such that the inclined face extends in the releasing direction as the inclined face extends in the reverse rotation direction. The second inclined face 61e is provided at the forward rotation-side end of each of the dog teeth 61a, and is inclined such that the inclined face extends in the releasing direction as the inclined face extends in the forward rotation direction.

Each of the dog teeth 62a of the piece 62 has a tooth crest 62c, a first inclined face 62d and a second inclined face 62e. The tooth crest 62c is a releasing-side end face, and is a face perpendicular to the axial direction. The first inclined face 62d and the second inclined face 62e each are inclined with respect to the axial direction. The first inclined face 62d is provided at the forward rotation-side end of each of the dog teeth 62a, and is inclined such that the inclined face extends in the engaging direction as the inclined face extends in the forward rotation direction. The second inclined face 62e is provided at the reverse rotation-side end of each of the dog teeth 62a, and is inclined such that the inclined face extends in the engaging direction as the inclined face extends in the reverse rotation direction.

When the dog teeth 61a of the sleeve 61 engage with the dog teeth 62a of the piece 62, the movement of the sleeve 61 in the axial direction can be restricted by the contact of the dog teeth 61a with the dog teeth 62a. For example, as shown in FIG. 5, when the tooth crest 61c of each of the dog teeth 61a contacts the tooth crest 62c of each of the dog teeth 62a, the rotation of the piece 62 can be stopped while the tooth crest 61c contacts the tooth crest 62c by the thrust of the actuator 70. As a result, the movement of the sleeve 61 in the axial direction is restricted, and there is a possibility that the engagement of the sleeve 61 with the piece 62 does not proceed.

As shown in FIG. 6, the movement of the sleeve 61 in the axial direction can be restricted by the contact of the first inclined face 61d of each of the dog teeth 61a with the first inclined face 62d of each of the dog teeth 62a. When the first inclined faces 61d, 62d contact with each other, and when the relationship among the thrust of the actuator 70, the reaction that acts on the dog teeth 62a and the friction force at each contact face satisfies a stop condition, the rotation of the piece 62 can be stopped while the first inclined faces 61d, 62d contact with each other. As a result, the movement of the sleeve 61 in the axial direction is restricted, so there is a possibility that the engagement of the sleeve 61 with the piece 62 does not proceed. The reaction that acts on each of the dog teeth 62a is, for example, caused by torque, inertia, rotation friction, and the like, from the drive wheels 31 or a prime mover, such as the engine 1.

As shown in FIG. 7, the movement of the sleeve 61 in the axial direction can be restricted by the contact of the second inclined face 61e of each of the dog teeth 61a with the second inclined face 62e of each of the dog teeth 62a. When the second inclined faces 61e, 62e contact with each other, and when the relationship among the thrust of the actuator 70, the reaction that acts on each of the dog teeth 62a and the friction force at the contact faces satisfies a stop condition, the rotation of the piece 62 can be stopped while the second inclined faces 61e, 62e contact with each other. As a result, the movement of the sleeve 61 in the axial direction is restricted, so there is a possibility that the engagement of the sleeve 61 with the piece 62 does not proceed.

Other than the contact situations shown in FIG. 5 to FIG. 7, it is also conceivable that the movement of the sleeve 61 in the axial direction is restricted while the side face of each of the dog teeth 61a contacts the side face of a corresponding one of the dog teeth 62a. In this specification, the state where the movement of the sleeve 61 in the axial direction is restricted by the contact of the sleeve 61 with the piece 62 is termed "halfway stopped state". The halfway stopped state is the state where the movement of the sleeve 61 in the axial direction is restricted while the stroke amount of the sleeve 61 does not reach a predetermined completely engaged stroke amount.

In the intermesh engagement device 60 according to the present embodiment, the sleeve 61 is elastically supported by the moving member 66 via the transmission spring 71. In the halfway stopped state, as shown in FIG. 8, the transmission spring 71 is compressed, and the plunger 65 and the sleeve 61 are spaced apart from each other. The kinetic energy of the sleeve 61 is converted to the potential energy of the transmission spring 71. When the halfway stopped state is cancelled from this state and then the sleeve 61 becomes relatively movable with respect to the piece 62, the sleeve 61 is pushed out in the engaging direction by the urging force of the transmission spring 71. The potential energy of the transmission spring 71 is converted to the kinetic energy of the sleeve 61, and the stroke speed of the sleeve 61 is increased. Thus, it is possible to completely engage the engagement mechanism 63 by quickly increasing the stroke amount of the sleeve 61.

As means for suppressing the occurrence of the halfway stopped state, it is conceivable that the thrust of the actuator 70 is increased in advance. By setting the thrust of the actuator 70 to a large value, it is conceivable that the halfway stopped state due to the contact of the inclined faces with each other as shown in FIG. 6 or FIG. 7 is hard to occur. However, when the thrust of the actuator 70 is increased, there is an inconvenience that collision noise due to a collision of the plunger 65 with the stopper 73 increases. In the intermesh engagement device 60, when the engagement mechanism 63 is completely engaged, the moving member 66 contacts the stopper 73. When the thrust of the actuator 70 is large, the speed of the moving member 66 increases, with the result that collision noise between the plunger 65 and the stopper 73 increases at the time when the engagement mechanism 63 is completely engaged. On the other hand, there is a possibility that only a reduction in the thrust of the actuator 70 does not ensure engagement reliability and responsiveness when the halfway stopped state occurs.

In the intermesh engagement device 60 according to the present embodiment, the control unit 74 initially executes first control for setting the thrust of the actuator to a thrust in a first region (see R1 in FIG. 10) at the time when the engagement mechanism 63 is engaged. The control unit 74 executes second control for setting the thrust of the actuator 70 to a thrust larger than the thrust in the first control when the halfway stopped state of the engagement mechanism 63 has occurred through the first control. The halfway stopped state is the state where the movement of the sleeve 61 is stopped while the engagement mechanism 63 is not completely engaged or the state where the moving speed of the sleeve 61 has decreased while the engagement mechanism 63 is not completely engaged. The halfway stopped state is also the state where a complete engagement condition of the engagement mechanism 63 is not achieved. The first control and the second control will be described with reference to FIG. 9 and FIG. 10.

In FIG. 9, the abscissa axis represents the stroke amount Sta of the armature 64, and the ordinate axis represents the force in the axial direction. The stroke amount Sta of the armature 64 is also the stroke amount of the moving member 66. The dashed line Sp1 indicates the urging force of the return spring 72. The urging force Sp1 of the return spring 72 depends on the stroke amount Sta of the armature 64. The length of the return spring 72 decreases as the stroke amount Sta of the armature 64 increases. Thus, the urging force Sp1 of the return spring 72 monotonously increases as the stroke amount Sta increases.

A total urging force Spt is the urging force that is the sum of the urging force Sp1 of the return spring 72 and the urging force Sp2 of the transmission spring 71. The urging force Sp1 of the return spring 72 and the urging force Sp2 of the transmission spring 71 each are a force that presses the moving member 66 toward the initial position, and is a reaction against the thrust of the actuator 70. When no halfway stopped state is occurring, the sleeve 61 is in contact with the plunger 65 as shown in FIG. 3. In this case, the spring force of the transmission spring 71 presses the sleeve 61 in the engaging direction, and presses the armature 64 in the releasing direction. That is, the spring force of the transmission spring 71 is neutral as the force that moves the moving member 66 in the axial direction.

In contrast, when the halfway stopped state occurs because of the contact of the sleeve 61 with the piece 62 as shown in FIG. 8, the spring force of the transmission spring 71 in the engaging direction is transmitted to the piece 62 instead of the plunger 65. The spring force of the transmission spring 71 in the engaging direction is transmitted to the dog teeth 62a of the piece 62 via the dog teeth 61a of the sleeve 61, and presses the piece 62 in the engaging direction. The sleeve 61 receives a reaction corresponding to the spring force of the transmission spring 71 from the piece 62, and the movement of the sleeve 61 is restricted.

Thus, only the spring force in the releasing direction acts on the moving member 66 within the spring force of the transmission spring 71 in both directions, and the moving member 66 is urged in the releasing direction. For example, as shown in FIG. 9, the case where the halfway stopped state occurs at the time when the stroke amount Sta of the armature 64 has reached a predetermined stroke amount St0 will be described. In this case, while the stroke amount Sta of the armature 64 is smaller than the predetermined stroke amount St0, the total urging force Spt coincides with the urging force Sp1 of the return spring 72. When the halfway stopped state occurs at the predetermined stroke amount St0, the urging force Sp2 of the transmission spring 71 begins to act in a direction in which the moving member 66 is pressed back, and the total urging force Spt increases discontinuously. After that, if the moving member 66 further moves in the engaging direction while the halfway stopped state is not eliminated, the urging force Sp2 of the transmission spring 71 increases with an increase in the stroke amount Sta.

FIG. 9 shows a maximum urging force that is generated by the transmission spring 71 as the urging force Sp2 of the transmission spring 71. The maximum urging force that is generated by the transmission spring 71 is the maximum urging force that is generated by the transmission spring 71 at each stroke position of the armature 64 when the movement of the sleeve 61 is restricted. The transmission spring 71 generates the maximum urging force, for example, when the halfway stopped state has occurred in a state where the tooth crest 61c of each of the dog teeth 61a contacts the tooth crest 62c of a corresponding one of the dog teeth 62a as shown in FIG. 5.

On the other hand, when the halfway stopped state does not occur, the total urging force Spt coincides with the urging force Sp1 of the return spring 72 irrespective of the stroke amount Sta of the armature 64. In other words, when the halfway stopped state does not occur, the urging force Sp2 of the transmission spring 71 as a reaction does not act on the moving member 66 until the engagement mechanism 63 is completely engaged.

In the intermesh engagement device 60 according to the present embodiment, the thrust of the actuator 70 in the first control is set to the thrust in the first region R1 shown in FIG. 10. The first region R1 is the range of the thrust that is larger than the urging force Sp1 of the return spring 72 and that is smaller than the maximum value of the total urging force Spt in the case where the halfway stopped state is occurring. The maximum value of the total urging force Spt is the sum of the urging force Sp1 of the return spring 72 at a stroke position and the maximum urging force that is generated by the transmission spring 71 at the stroke position in the case where the movement of the sleeve 61 is restricted. In FIG. 10, a curve L1 indicates the thrust that is generated by the actuator 70 when a command current value to the actuator 70 is set to a first command current value i1 (described later). In the first control, the command current value to the actuator 70 is set to the first command current value i1. A curve L2 indicates the thrust that is generated by the actuator 70 when the command current value to the actuator 70 is set to a second command current value i2 (described later).

When the command current value of the actuator 70 is set to the first command current value i1, the thrust of the actuator 70 is mainly set as the thrust in the first region R1. The thrust in the first region R1 is larger than the urging force Sp1 of the return spring 72 at a stroke position of the moving member 66, and is smaller than the sum of the urging force Sp1 of the return spring 72 at the stroke position and the maximum urging force that is generated by the transmission spring 71 at the stroke position in the case where the movement of the sleeve 61 is restricted. As an example, when the stroke amount Sta is St1 shown in FIG. 10, the thrust of the actuator 70 in the first control is larger than an urging force Sp11 of the return spring 72 and is smaller than the sum Spt1 of the urging force Sp11 of the return spring 72 at the stroke position and a maximum urging force Sp21 that is generated by the transmission spring 71 at the stroke position in the case where the movement of the sleeve 61 is restricted.

Thus, when the halfway stopped state does not occur, it is possible to completely engage the engagement mechanism 63 by using the thrust in the first region R1. The thrust of the actuator 70 is desirably a thrust that slightly exceeds the urging force Sp1 of the return spring 72 within the first region R1. When the thrust of the actuator 70 is set to a small value within the range of the first region R1, collision noise between the plunger 65 and the stopper 73 at the time of complete engagement of the engagement mechanism 63 is reduced.

The control unit 74 executes the second control when the halfway stopped state of the engagement mechanism 63 has occurred through the first control. In the second control, the control unit 74 sets the thrust of the actuator 70 to the thrust (see L2 in FIG. 10) larger than the thrust (see L1 in FIG. 10) in the first control. The second control is desirably control for completely engaging the engagement mechanism 63. In the second control, the thrust of the actuator 70 is larger than the thrust in the first control, so the possibility of elimination of the halfway stopped state improves. The halfway stopped state of the engagement mechanism 63, for example, includes the condition that the stroke amount of the sleeve 61 has not reached a completely engaged stroke yet. In the present embodiment, when the stroke amount of the sleeve 61 does not become the completely engaged stroke even when the first control is executed for a predetermined time, it is determined that the halfway stopped state has occurred. The halfway stopped state may be determined on the basis of another condition, and may be, for example, determined on the basis of the stroke amount of the sleeve 61 and a rate of change in the stroke amount. As an example, when the stroke amount of the sleeve 61 is smaller than the completely engaged stroke amount and the rate of change in the stroke amount of the sleeve 61 is lower than or equal to a predetermined rate of change, the halfway stopped state may be determined.

In the present embodiment, in the second control, the thrust of the actuator 70 is set to the thrust larger than the thrust in the first region R1. The thrust of the actuator 70 in the second control is, for example, set to the thrust in the second region R2 shown in FIG. 10. The second region R2 is larger than the total urging force Spt in the case where the halfway stopped state is occurring as shown in FIG. 10. That is, the control unit 74 sets the thrust of the actuator 70 in the second control to the thrust larger than the sum of the urging force Sp1 of the return spring 72 at a stroke position and the maximum urging force that is generated by the transmission spring 71 at the stroke position in the case where the movement of the sleeve 61 is restricted. For example, when the stroke amount Sta of the armature 64 is St1 shown in FIG. 10, the thrust of the actuator 70 in the second control is set so as to be larger than the sum Stp1 of the urging force Sp11 of the return spring 72 at the stroke position and the maximum urging force Sp21 that is generated by the transmission spring 71 at the stroke position in the case where the movement of the sleeve 61 is restricted. The control unit 74 according to the present embodiment sets the command current value to the actuator 70 to the second command current value i2 larger than the first command current value i1 in the second control. The second command current value i2 is a current value at which the thrust of the actuator 70 is set to the thrust in the second region R2.

When the thrust of the actuator 70 is set to the thrust in the second region R2, the possibility of elimination of the halfway stopped state increases. For example, in the case of the halfway stopped state in which the inclined faces of the dog teeth 61a, 62a contact with each other, it is conceivable that the halfway stopped state is eliminated when the thrust of the actuator 70 increases from the thrust in the first region R1 to the thrust in the second region R2 and the possibility of complete engagement of the engagement mechanism 63 is increased.

When the thrust of the actuator 70 is set to the thrust in the second region R2, the thrust of the actuator 70 exceeds the total urging force Spt. Thus, in the halfway stopped state, it is possible to cause the moving member 66 to make a stroke in advance of the sleeve 61. That is, even in the state where the movement of the sleeve 61 in the axial direction is restricted, it is possible to move the moving member 66 in the engaging direction by using the thrust in the second region R2. In this case, the length of the transmission spring 71 decreases as the stroke amount Sta of the moving member 66 increases. Thus, when the halfway stopped state is eliminated and the sleeve 61 is relatively movable in the axial direction with respect to the piece 62, it is possible to quickly move the sleeve 61 to a completely engaged position by using the restoring force of the transmission spring 71.

The control unit 74 according to the present embodiment executes torque variation control in the second control. The torque variation control is control for varying the output torque of the first rotating machine MG1. The control unit 74 has the function of controlling the first rotating machine MG1 connected to the piece 62. The control unit 74, for example, requires the ECU 50 to execute the torque variation control over the first rotating machine MG1. The ECU 50 issues a command to execute the torque variation control to the first rotating machine MG1 in response to the request from the control unit 74. The torque variation control is, for example, control for changing a torque command value to the first rotating machine MG1 (hereinafter, simply referred to as "MG1 torque command value") in a predetermined waveform. The predetermined waveform is, for example, a waveform, such as a rectangular waveform, a triangular waveform and a sinusoidal waveform. In the torque variation control, the MG1 torque command value is desirably changed alternately between torque in the forward rotation direction and torque in the reverse rotation direction. By executing the torque variation control, the magnitude or rotation direction of the torque that is input to the piece 62 changes. Thus, elimination of the halfway stopped state is facilitated.

Engagement control in the intermesh engagement device 60 according to the present embodiment will be described with reference to FIG. 1 to FIG. 11. A control flow shown in FIG. 1 is executed at the time when a command to shift the intermesh engagement device 60 from a released state to an engaged state is issued, and is, for example, repeatedly executed at predetermined intervals. A time chart shown in FIG. 11 shows changes in command current value (a command value of thrust) in the case where the halfway stopped state has occurred in the engagement control according to the present embodiment.

In step S10 of FIG. 1, the control unit 74 issues a command to supply a current to the coil 67. The control unit 74 executes the first control for setting the command value of current for energizing the coil 67 to the first command current value i1. The first command current value i1 is a current value at which it is possible to set the thrust of the actuator 70 to the thrust in the first region R1. The first command current value i1 is, for example, determined in advance on the basis of the spring characteristics of the return spring 72 and the spring characteristics of the transmission spring 71. When the amount of current supplied to the coil 67 is set to the first command current value i1, the thrust that is generated by the actuator 70 becomes a value indicated by the curve L1 shown in FIG. 10 with the stroke amount Sta of the moving member 66.

The thrust L1 that is generated in response to the first command current value i1 is at least larger than the urging force Sp1 of the return spring 72 in all the region of the stroke amount Sta of the armature 64. When the stroke amount Sta of the armature 64 is smaller than a boundary stroke St2, the thrust L1 of the actuator 70, which is generated in response to the first command current value i1, is smaller than the maximum value of the total urging force Spt in the case where the halfway stopped state is occurring. On the other hand, when the stroke amount Sta of the armature 64 is larger than or equal to the boundary stroke St2, the thrust L1 of the actuator 70, which is generated in response to the first command current value i1, becomes larger than or equal to the maximum value of the total urging force Spt in the case where the halfway stopped state is occurring.

Thus, the first control for setting the thrust of the actuator 70 to the thrust in the first region R1 is understood to be executed while the stroke amount Sta of the armature 64 is smaller than the boundary stroke St2. When the stroke amount Sta of the armature 64 exceeds the boundary stroke St2, the thrust L1 that is generated in response to the first command current value i1 becomes the thrust in the second region R2. Thus, when the stroke amount Sta of the armature 64 is larger than or equal to the boundary stroke St2, the thrust L1 that is generated in response to the first command current value i1 is understood to be sufficiently large to completely engage the engagement mechanism 63. In FIG. 11, the engagement control over the engagement mechanism 63 is started at time t1, and the command current value is set to the first command current value i1. After step S10 is executed, the process proceeds to step S20.

In step S20, the control unit 74 determines whether the stroke of the sleeve 61 has completed. Whether the stroke of the sleeve 61 has completed is, for example, determined on the basis of the stroke amount that is detected by the stroke sensor 75. When the stroke amount detected by the stroke sensor 75 is larger than or equal to a predetermined threshold, affirmative determination is made in step S20. As a result of the determination of step S20, when it is determined that the stroke of the sleeve 61 has completed (Yes in step S20), the process proceeds to step S30; otherwise (No in step S20), the process proceeds to step S40.

In step S30, the control unit 74 executes holding current control. The holding current control is control for keeping the completely engaged state of the engagement mechanism 63. The command current value to the actuator 70 in the holding current control is set to a third command current value i3. As shown in FIG. 11, the third command current value i3 is a current value smaller than the first command current value i1. The third command current value i3 is a current value at which the thrust of the actuator 70 is larger than the urging force Sp1 of the return spring 72 at the time of complete engagement. In FIG. 11, it is determined at time t3 that the stroke of the sleeve 61 has completed, and the command current value is set to the third command current value i3. After step S30 is executed, the control flow ends.

In step S40, the control unit 74 determines whether the halfway stopped state has occurred. The control unit 74 determines whether an elapsed time from when the command current value to the actuator 70 is set to the first command current value i1 has exceeded a predetermined time. The predetermined time is determined on the basis of a time required at the time of completely engaging the engagement mechanism 63 by using the thrust L1 that is generated at the first command current value i1. When the control unit 74 starts the first control by changing the command current value to the actuator 70 to the first command current value i1, the control unit 74 starts counting an elapsed time with the use of a timer. When the elapsed time counted by the timer exceeds the predetermined time, affirmative determination is made in step S40. As a result of the determination of step S40, when it is determined that the elapsed time from the start of the first control exceeds the predetermined time (Yes in step S40), the process proceeds to step S50; otherwise (No in step S40), the process returns to step S10.

In step S50, the control unit 74 executes the second control for setting the command current value to the actuator 70 to the second command current value i2. The control unit 74 sets the command value of the amount of current supplied to the coil 67, to the second command current value i2. The second command current value i2 is, for example, determined in advance on the basis of the spring characteristics of the return spring 72 and the spring characteristics of the transmission spring 71. In FIG. 11, the command current value is changed from the first command current value i1 to the second command current value i2 at time t2. After step S50 is executed, the process proceeds to step S60.

In step S60, the control unit 74 executes the torque variation control. The control unit 74 requires the ECU 50 to execute the torque variation control. The ECU 50 varies the MG1 torque command value in response to the request from the control unit 74. After step S60 is executed, the process proceeds to step S20. That is, until it is determined that the stroke of the sleeve 61 has completed, the second control including the torque variation control is continued.

With the intermesh engagement device 60 according to the present embodiment, the thrust of the actuator 70 in the first control is set to the thrust in the first region R1. Unless the halfway stopped state occurs, it is possible to completely engage the engagement mechanism 63 through the first control. Because the thrust in the first region R1 is suppressed to a force smaller than the maximum value of the total urging force Spt at the time when the halfway stopped state is occurring, collision noise between the moving member 66 and the stopper 73 is reduced. When the halfway stopped state of the engagement mechanism 63 has occurred through the first control, the second control is executed. The thrust of the actuator 70 in the second control is the thrust larger than the thrust in the first control. Thus, the halfway stopped state is easily eliminated, so the engagement reliability and responsiveness of the engagement mechanism 63 improve.

In the present embodiment, the thrust of the actuator 70 in the second control is set to the thrust in the second region R2. Thus, even when the halfway stopped state has occurred, it is possible to make a stroke of the moving member 66 in the engaging direction, and move the moving member 66 to the maximum stroke position. Thus, it is possible to make a stoke of the sleeve 61 in the engaging direction by setting the amount of contraction of the transmission spring 71 to a large value and fully utilizing the urging force of the transmission spring 71. Even when the movement of the sleeve 61 is restricted, only the sleeve 61 stops, and the moving member 66 is allowed to further make a stroke. With this configuration, by reducing the inertia of a member that starts the movement of the sleeve 61 (the inertia of the sleeve 61) when restrictions on the movement of the sleeve 61 are cancelled, it is possible to improve responsiveness up to complete engagement. Thus, with the intermesh engagement device 60 according to the present embodiment, it is possible to improve the reliability and responsiveness of engagement of the engagement mechanism 63.

In the present embodiment, by setting the command current value to the actuator 70 to a predetermined value, it is possible to control the actuator 70 in the first control and the second control in a feed-forward manner. A time from the start of the engagement control over the engagement mechanism 63 to complete engagement of the engagement mechanism 63 is about 10 [msec] at the shortest, and there is a possibility that sufficient controllability is not ensured even when the thrust is subjected to feedback control. In contrast, by controlling the actuator 70 with the command current value determined on the basis of the characteristics of the return spring 72 and transmission spring 71 in a feed-forward manner, it is possible to improve the controllability of engagement speed of the engagement mechanism 63. Thus, it becomes easy to accurately control the stroke speed of the moving member 66 at the time when the engagement mechanism 63 is completely engaged, and reduce collision noise. By determining the first command current value i1 and the second command current value i2 in advance in terms of suppressing collision noise, it is possible to design in advance the speed at which the moving member 66 collides with the stopper 73. In the present embodiment, when the halfway stopped state does not occur, the speed at which the moving member 66 collides with the stopper 73 is controlled by the first command current value i1. When the halfway stopped state has occurred, the speed at which the moving member 66 collides with the stopper 73 is controlled by the second command current value i2.

The intermesh engagement device 60 according to the present embodiment executes the torque variation control in the second control. Thus, elimination of the halfway stopped state is facilitated, so it is possible to improve the engagement reliability and responsiveness of the engagement mechanism 63.

Figure 12:
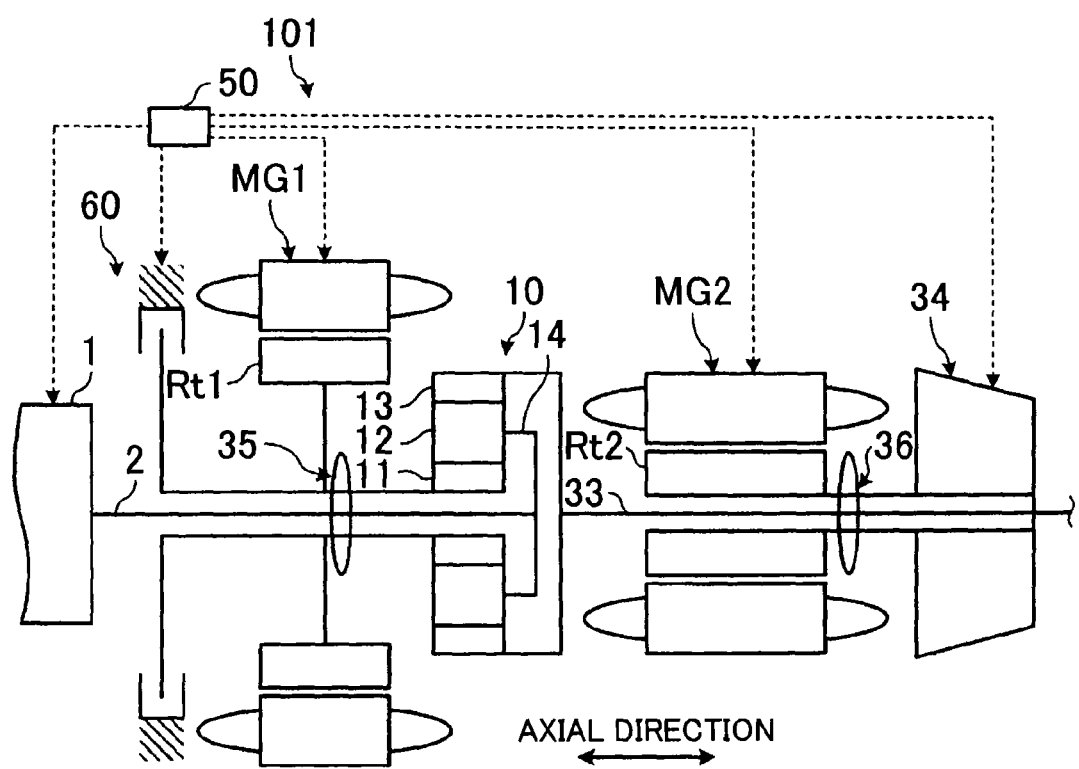
FIG. 12 is a schematic configuration view of a vehicle according to a second embodiment of the invention.

Next, a second embodiment will be described with reference to FIG. 12. In the second embodiment, like reference numerals denote components having similar functions to those described in the first embodiment, and the overlap description is omitted. FIG. 12 is a schematic configuration view of a vehicle according to the second embodiment. A vehicle driving system 101 according to the second embodiment differs from the vehicle driving system 100 according to the first embodiment in that the second rotating machine MG2 is connected via a transmission unit 34.

As shown in FIG. 12, the first ring gear 13 of the first planetary gear train 10 is connected to an output shaft 33. The output shaft 33 is, for example, connected to right and left drive wheels via a differential unit or a reduction gear. The second rotating machine MG2 is connected to the output shaft 33 via the transmission unit 34. The transmission unit 34 changes the speed of rotation of the second rotating machine MG2 and then outputs the rotation to the output shaft 33. The transmission unit 34 is, for example, a stepped transmission mechanism or a continuously variable transmission mechanism. By adjusting the speed ratio between the rotor Rt2 of the second rotating machine MG2 and the output shaft 33 with the use of the transmission unit 34, it is possible to operate the second rotating machine MG2 in a high-efficiency rotation speed region. A resolver 35 detects the rotation speed or rotation position of the rotor Rt1 of the first rotating machine MG1. The ECU 50 controls the first rotating machine MG1 on the basis of the detected result of the resolver 35. A resolver 36 detects the rotation speed or rotation position of the rotor Rt2 of the second rotating machine MG2. The ECU 50 controls the second rotating machine MG2 on the basis of the detected result of the resolver 36.

The intermesh engagement device 60, as well as the intermesh engagement device 60 according to the first embodiment, functions as a brake device that restricts the rotation of the first sun gear 11. Engagement control over the intermesh engagement device 60 may be similar to the engagement control of the first embodiment.

Figure 13:
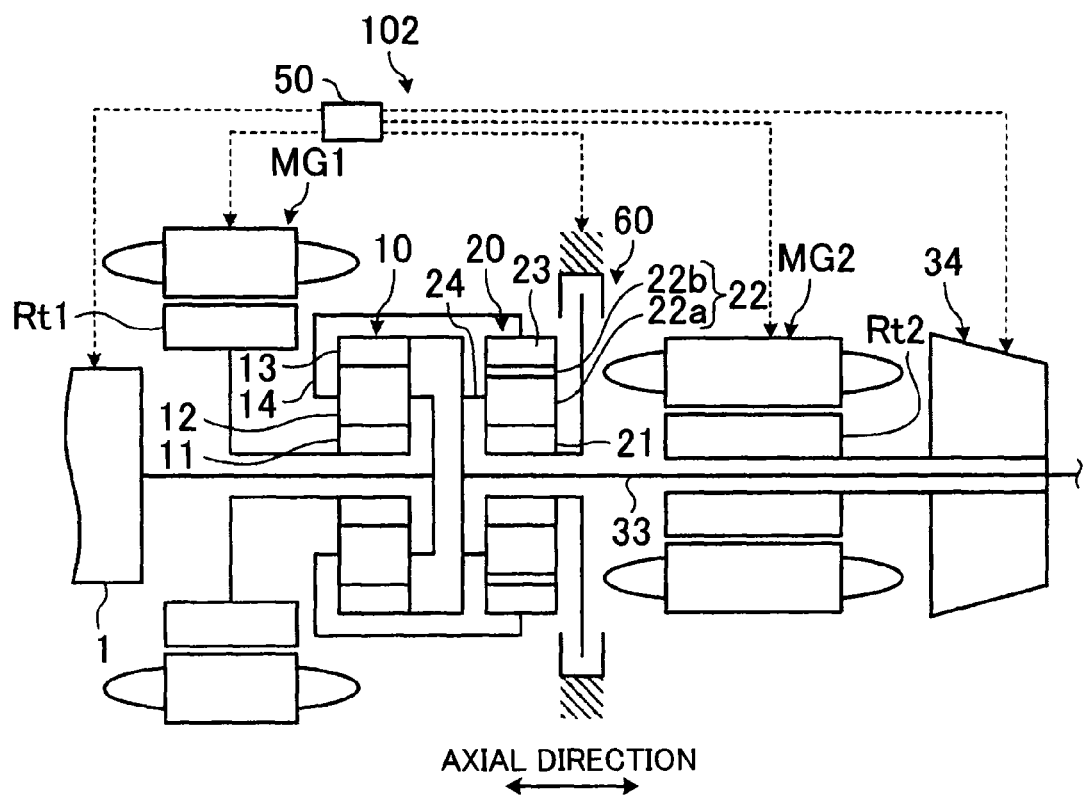
FIG. 13 is a schematic configuration view of a vehicle according to a third embodiment of the invention.

Next, a third embodiment will be described with reference to FIG. 13. In the third embodiment, like reference numerals denote components having similar functions to those described in the first embodiment or the second embodiment, and the overlap description is omitted. FIG. 13 is a schematic configuration view of a vehicle according to the third embodiment. A vehicle driving system 102 according to the third embodiment differs from the vehicle driving system 101 according to the second embodiment in that overdrive lock is possible. The overdrive lock indicates the state where the speed ratio between the engine rotation speed and the rotation speed of the output shaft 33 is fixed to a predetermined overdrive speed ratio.

As shown in FIG. 13, the second planetary gear train 20 is of a double pinion type. The second pinion gears 22 are formed of pairs of gears 22a, 22b. Each inner pinion gear 22a is in mesh with the second sun gear 21 and a corresponding one of the outer pinion gears 22b. Each outer pinion gear 22b is in mesh with a corresponding one of the inner pinion gears 22a and the second ring gear 23.

The first carrier 14 is connected to the second ring gear 23, and integrally rotates with the second ring gear 23. The first ring gear 13 is connected to the second carrier 24, and integrally rotates with the second carrier 24. As in the case of the vehicle driving system 101 according to the second embodiment, the second rotating machine MG2 is connected to the output shaft 33 via the transmission unit 34.

The intermesh engagement device 60 functions as a brake device that restricts the rotation of the second sun gear 21. When the intermesh engagement device 60 is in the released state, the ECU 50 causes the first rotating machine MG1 to function as a reaction receiver against engine torque. The first rotating machine MG1 causes the engine torque to be output from the first ring gear 13 to the output shaft 33 by outputting reaction torque.

When the intermesh engagement device 60 is in the engaged state, the rotation of the second sun gear 21 is restricted. Thus, the second sun gear 21 functions as a reaction receiver against engine torque, and causes the engine torque to be output from the first ring gear 13 to the output shaft 33. When the rotation of the second sun gear 21 is restricted, the ratio between the rotation speed of the first carrier 14 and the rotation speed of the first ring gear 13 is fixed. In the first planetary gear train 10, an overdrive state is established. In the overdrive state, the rotation speed of the first ring gear 13 is higher than the rotation speed of the first carrier 14 and the rotation speed of the engine 1. The rotation speed ratio (speed ratio) at this time is fixed. When an overdrive locked state is established at a high vehicle speed, or the like, it is possible to suppress the occurrence of circulation of power. Engagement control over the intermesh engagement device 60 may be, for example, similar to the engagement control according to the first embodiment.

Next, a fourth embodiment will be described with reference to FIG. 14. In the fourth embodiment, like reference numerals denote components having similar functions to those described in any one of the first to third embodiments, and the overlap description is omitted. FIG. 14 is a schematic configuration view of a vehicle according to the fourth embodiment. A vehicle driving system 103 according to the fourth embodiment differs from the vehicle driving system 102 according to the third embodiment in that a change between a low-side speed ratio and a high-side speed ratio is carried out in the second planetary gear train 20.

As shown in FIG. 14, the second planetary gear train 20 is of a double pinion type, and includes the second sun gear 21, the second pinion gears 22, the second ring gear 23, and the second carrier 24. Each of the second pinion gears 22 includes a pair of gears 22a, 22b. Each inner pinion gear 22a is in mesh with the second sun gear 21 and a corresponding one of the outer pinion gears 22b. Each outer pinion gear 22b is in mesh with a corresponding one of the inner pinion gears 22a and the second ring gear 23. The first ring gear 13 is connected to the second ring gear 23, and integrally rotates with the second ring gear 23. The second carrier 24 is connected to the output shaft 33. An intermesh engagement device 80 includes a sleeve 81, a hub 82, a first piece 83, a second piece 84, an actuator 85, and a control unit 86. An engagement mechanism 87 includes the sleeve 81, the hub 82, the first piece 83, and the second piece 84. The sleeve 81 is movable in the axial direction. The sleeve 81 has dog teeth on its inner periphery.

The hub 82 is connected to the second sun gear 21, and integrally rotates with the second sun gear 21. The first piece 83 is fixed to a vehicle body side so as to be non-rotatable. The second piece 84 is connected to the output shaft 33, and integrally rotates with the output shaft 33. The hub 82, the first piece 83 and the second piece 84 each have external dog teeth. The hub 82, the first piece 83 and the second piece 84 are arranged next to each other coaxially with the output shaft 33. The hub 82 is arranged between the first piece 83 and the second piece 84. The dog teeth of the hub 82, first piece 83 and second piece 84 are paired with the dog teeth of the sleeve 81. The actuator 85 is an actuating device that moves the sleeve 81 in the axial direction.

The actuator 85, for example, applies a thrust to the sleeve 81 in the axial direction by using electromagnetic force. The configuration of the actuator 85 may be, for example, the same as or a similar to the configuration of the actuator 70 according to the first embodiment. The actuator 85 is able to selectively apply a thrust to a moving member in a direction (hereinafter, referred to as "first direction") D1 or a thrust to the moving member in a direction (hereinafter, referred to as "second direction"). The first direction D1 is a direction in which the sleeve 81 is engaged with the first piece 83. The second direction D2 is a direction in which the sleeve 81 is engaged with the second piece 84. The intermesh engagement device 80 has a first stopper and a second stopper. The first stopper is provided at the maximum stroke position of the moving member at the time when the actuator 85 applies the thrust in the first direction D1. The second stopper is provided at the maximum stroke position of the moving member at the time when the actuator 85 applies the thrust in the second direction D2.

The intermesh engagement device 80 changes among a released state, a first engaged state (81a) and a second engaged state (81b) on the basis of the position of the sleeve 81 in the axial direction. The released state of the intermesh engagement device 80 is the state where the sleeve 81 is in mesh with the hub 82 and is not in mesh with the first piece 83 or the second piece 84. In the released state, the engine 1 and the first rotating machine MG1 are disconnected from the output shaft 33. The first engaged state of the intermesh engagement device 80 is the state where the sleeve 81 is in mesh with the hub 82 and the first piece 83 and is not in mesh with the second piece 84. In the first engaged state, the rotation of the first sun gear 11 is restricted. The rotation speed of the second carrier 24 that is the output rotating element of the second planetary gear train 20 becomes higher than the rotation speed of the second ring gear 23 that is the input rotating element of the second planetary gear train 20. That is, in the second planetary gear train 20, the rotation speed that is input from the engine 1 is increased and is output to the output shaft 33.

The second engaged state of the intermesh engagement device 80 is the state where the sleeve 81 is in mesh with the hub 82 and the second piece 84 and is not in mesh with the first piece 83. In the second engaged state, the second sun gear 21 is coupled to the second carrier 24, and the differential rotation of the second planetary gear train 20 is restricted. Thus, in the second planetary gear train 20, the rotation speed that is input from the engine 1 is not reduced or increased and is output to the output shaft 33 at a constant speed. In this way, in the intermesh engagement device 80, the speed ratio of the second planetary gear train 20 in the second engaged state is lower in speed than the speed ratio of the second planetary gear train 20 in the first engaged state.

A one-way clutch 37 is provided between the second sun gear 21 and the output shaft 33. The one-way clutch 37 restricts that the rotation speed of the second sun gear 21 becomes higher than the rotation speed of the output shaft 33.

The intermesh engagement device 80 according to the present embodiment differs from the intermesh engagement device 60 according to the first embodiment, and is able to not only function as a brake device that restricts the rotation of the hub 82 but also function as a clutch device that engages rotors with each other. In the first engaged state of the intermesh engagement device 80, the sleeve 81 restricts the rotation of the hub 82 by connecting the hub 82 to the first piece 83. On the other hand, in the second engaged state of the intermesh engagement device 80, the sleeve 81 causes the second sun gear 21 and the output shaft 33 to integrally rotate by connecting the hub 82 to the second piece 84.

The control unit 86 sets the intermesh engagement device 80 to any one of the released state, the first engaged state and the second engaged state on the basis of the traveling state, or the like. The control unit 86 executes engagement control when the control unit 86 changes the intermesh engagement device 80 from the released state to the first engaged state or the second engaged state. The control unit 86 executes the first control for setting the thrust of the actuator 85 to the thrust in the first region R1 at the time when the intermesh engagement device 80 is engaged. The control unit 86 executes the second control for setting the thrust of the actuator 85 to the thrust larger than the thrust in the first control when the halfway stopped state of the engagement mechanism 87 has occurred through the first control. The second control is desirably control for completely engaging the engagement mechanism 87.

The first region R1 according to the present embodiment, as well as the first region R1 according to the first embodiment, is larger than the urging force of a return spring at a stroke position of the moving member and is smaller than the sum of the urging force of the return spring at the stroke position and the maximum urging force that is generated by a transmission spring at the stroke position in the case where the movement of the sleeve 81 is restricted.

With the intermesh engagement device 80 according to the present embodiment, it is possible to ensure the responsiveness at the time when the engagement mechanism 87 is changed to the first engaged state or the second engaged state and also to reduce collision noise between the moving member and each stopper.

Figure 15:
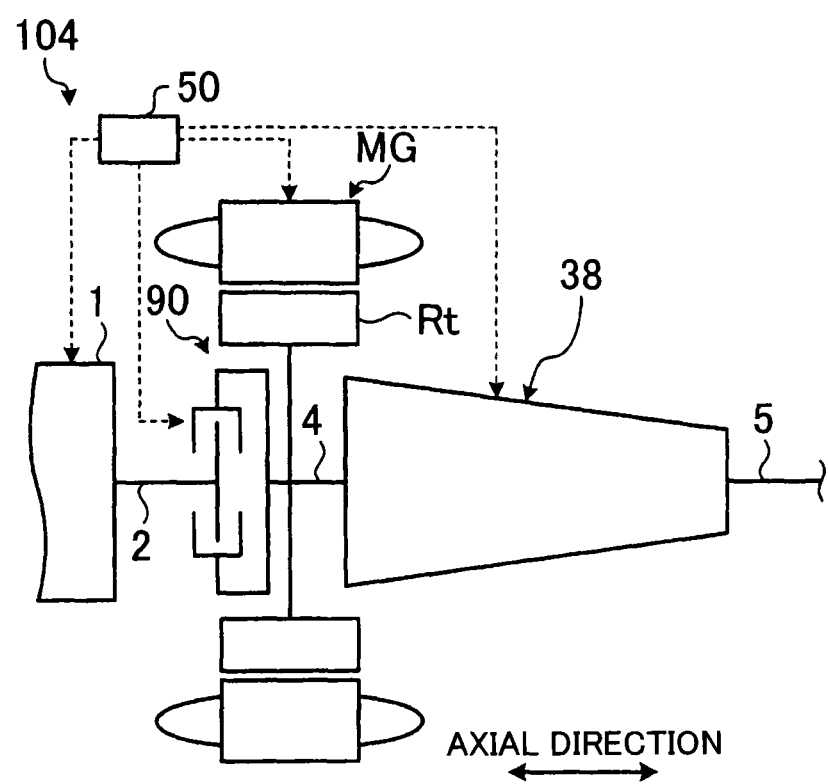
FIG. 15 is a schematic configuration view of a vehicle according to a fifth embodiment of the invention.

Next, a fifth embodiment will be described with reference to FIG. 15. In the fifth embodiment, like reference numerals denote components having similar functions to those described in any one of the first to fourth embodiments, and the overlap description is omitted. FIG. 15 is a schematic configuration view of a vehicle according to the fifth embodiment. A vehicle driving system 104 according to the fifth embodiment differs from the vehicle driving systems 100, 101, 102, 103 according to the first to fourth embodiments, for example, in that the number of the rotating machines MG is one and an intermesh engagement device 90 connects the engine 1 to the rotating machine MG or disconnects the engine 1 from the rotating machine MG.

As shown in FIG. 15, the input shaft 2 and the rotary shaft 4 of the rotor Rt of the rotating machine MG are connected to each other via the intermesh engagement device 90. The configuration of the intermesh engagement device 90 may be, for example, the same as or a similar to the configuration of the intermesh engagement device 60 according to the first embodiment. The intermesh engagement device 90 connects the input shaft 2 to the rotary shaft 4 when engaged, and disconnects the input shaft 2 from the rotary shaft 4 when released. The rotary shaft 4 is connected to the output shaft 5 via the transmission unit 38. The output shaft 5 is connected to the drive wheels via a reduction mechanism or a differential unit. The transmission unit 38 is, for example, a stepped transmission mechanism or a continuously variable transmission mechanism. The ECU 50 sets the intermesh engagement device 90 in the released state when the vehicle travels in the EV drive mode by using the power of the rotating machine MG or when the vehicle travels by coasting. The ECU 50 sets the intermesh engagement device 90 in the engaged state when the vehicle travels in the HV drive mode by using the power of the engine 1. The ECU 50 executes engagement control over the intermesh engagement device 90 when the ECU 50 changes the intermesh engagement device 90 from the released state to the engaged state. The engagement control over the intermesh engagement device 90 is, for example, similar to the engagement control over the intermesh engagement device 60 according to the first embodiment.

Next, a first alternative embodiment to each of the above embodiments will be described. In the first to fifth embodiments, the thrust of the actuator 70 or actuator 85 in the second control is set to the thrust in the second region R2; however, the thrust of the actuator 70 or actuator 85 is not limited to the thrust in the second region R2. The thrust of the actuator 70 or actuator 85 in the second control just needs to be a thrust larger than the thrust in the first control. When the torque variation control is executed in the second control, elimination of the halfway stopped state is facilitated. In the second control, it becomes easy to eliminate the halfway stopped state because of the synergy effect of setting the thrust of the actuator 70 or actuator 85 to a value larger than the thrust in the first control in combination with the torque variation control.

Next, a second alternative embodiment to each of the above embodiments will be described. In each of the above embodiments, the command current value to the actuator 70 or actuator 85 is constant in the first control and the second control; however, the command current value to the actuator 70 or actuator 85 is not limited to this configuration. The command current value to the actuator 70 or actuator 85 may be variable. For example, in the first control, the command current value may be adjusted such that the thrust of the actuator 70 is kept at a value in the first region R1. In this case, it is desirable to adjust the command current value on the basis of a detected value or estimated value of the stroke amount Sta of the moving member 66 including the armature 64.

Next, a third alternative embodiment to each of the above embodiments will be described. In each of the above embodiments, the thrust of the actuator 70 or actuator 85 in the second control may be determined on the basis of the stroke amount Sta of the moving member. As in the case of the first embodiment, when the thrust of the actuator 70 in the second control is set to the thrust in the second region R2 (see FIG. 10), it is possible to continue making a stroke of the moving member 66 irrespective of the mode of the halfway stopped state. Among various halfway stopped states, in the halfway stopped state in which the tooth crests 61*c*, 62*c* of the dog teeth 61*a*, 62*a* contact each other, the urging force of the transmission spring 71 becomes maximum. When the thrust of the actuator 70 is set so as to be able to make a stroke of the moving member 66 against the urging force of the return spring 72 and the urging force of the transmission spring 71, it is possible to improve the reliability and responsiveness of engagement. However, in the halfway stopped state, there is a case where not so large thrust is required.

The thrust in the second control may be determined on the basis of the stroke amount Sta of the moving member 66. It is possible to estimate the amount of contraction of the transmission spring 71 from the stroke amount Sta of the moving member 66 and the stroke amount of the sleeve 61. The thrust of the actuator 70 in the second control may be determined on the basis of the estimated result of the amount of contraction. The thrust in the second control is desirably set to a larger value as the estimated amount of contraction increases. The thrust in the second control is desirably larger than the sum of the urging force of the return spring 72 at a stroke amount of the moving member 66 and the urging force based on the estimated amount of contraction of the transmission spring 71 at the stroke amount.

Next, a fourth alternative embodiment to each of the above embodiments will be described. In each of the above embodiments, the actuator 70 or the actuator 85 is an electromagnetic actuator; however, the actuator 70 or the actuator 85 is not limited to the electromagnetic actuator. The actuator 70 or the actuator 85 may generate a thrust by hydraulic pressure, or the like, instead of generating a thrust by using electromagnetic force. When the thrust is generated by using hydraulic pressure, or the like, the thrust of the actuator 70 or actuator 85 may be set to a constant value or may be variable with the stroke amount of the sleeve or the stroke amount of the moving member. For example, the thrust of the actuator 70 or actuator 85 may be increased with an increase in the stroke amount of the sleeve or moving member.

In each of the above embodiments, another power source may be mounted instead of the engine 1. The configurations described in the above embodiments and alternative embodiments may be implemented in combination as needed.

What is claimed is:

1. An intermesh engagement device comprising:
    an engagement mechanism that is an intermesh mechanism including a piece and a sleeve, the engagement mechanism being configured to be engaged or released as the piece and the sleeve relatively move in an axial direction;
    a moving member configured to move in the axial direction;
    an actuator configured to apply a thrust to the moving member in a direction in which the sleeve is engaged with the piece;
    a transmission spring interposed between the moving member and the sleeve, the transmission spring being configured to transmit the thrust of the actuator from the moving member to the sleeve;
    a return spring configured to apply an urging force to the moving member in a direction opposite to the direction of the thrust of the actuator;
    a stopper provided at a maximum stroke position of the moving member, the stopper being configured to stop the moving member; and
    an electronic control unit configured to:
        (i) when the engagement mechanism is engaged, execute a first control for setting the thrust of the actuator to a thrust in a first region, and
        (ii) when a halfway stopped state of the engagement mechanism has occurred through the first control, execute a second control for setting the thrust of the actuator to a thrust larger than the thrust in the first control, the first region being a range in which the thrust of the actuator at a stroke position of the moving member is larger than the urging force of the return spring, and the first region being a range in which the thrust of the actuator is smaller than the sum of the urging force of the return spring at the stroke position and a maximum urging force that is generated by the transmission spring at the stroke position in the case where movement of the sleeve is restricted.

2. The intermesh engagement device according to claim 1, wherein
the actuator is configured to attract the moving member by using electromagnetic force,
the electronic control unit is configured to set a command current value, and
the electronic control unit is further configured to:
(i) in the first control, set a first command current value for the command current value, the first command current value being supplied to the actuator in the first control,
(ii) in the second control, set a second command current value larger than the first command current value for the command current value, the second command current value being supplied to the actuator in the second control, and
(iii) execute feed-forward control using the first command current value and the second command current value.

3. The intermesh engagement device according to claim 2, wherein
the electronic control unit is configured to set a third command current value for a command current value in holding current control for keeping the engagement mechanism in a completely engaged state, the command current value being supplied to the actuator in the holding current control, and the third command current value is a current value smaller than the first command current value.

4. The intermesh engagement device according to claim 1, wherein
the electronic control unit is configured to:
(i) control a rotating machine connected to the piece, and
(ii) execute a torque variation control for varying an output torque of the rotating machine in the second control.

* * * * *